(12) United States Patent
Kamimurai et al.

(10) Patent No.: US 11,783,426 B2
(45) Date of Patent: Oct. 10, 2023

(54) INFORMATION PROCESSING DEVICE

(71) Applicant: Mitsubishi Electric Corporation, Tokyo (JP)

(72) Inventors: Akio Kamimurai, Tokyo (JP); Masashi Mori, Tokyo (JP); Katsuyuki Sumimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 148 days.

(21) Appl. No.: 17/422,027

(22) PCT Filed: Jan. 17, 2019

(86) PCT No.: PCT/JP2019/001227
§ 371 (c)(1),
(2) Date: Jul. 9, 2021

(87) PCT Pub. No.: WO2020/148854
PCT Pub. Date: Jul. 23, 2020

(65) Prior Publication Data
US 2022/0101444 A1    Mar. 31, 2022

(51) Int. Cl.
*G06Q 40/08* (2012.01)
*G06Q 30/0207* (2023.01)
*G07C 5/00* (2006.01)
*G07C 5/08* (2006.01)

(52) U.S. Cl.
CPC ......... *G06Q 40/08* (2013.01); *G06Q 30/0207* (2013.01); *G07C 5/008* (2013.01); *G07C 5/0808* (2013.01)

(58) Field of Classification Search
CPC .................................................. G06Q 40/08

USPC ............................................................ 705/4
See application file for complete search history.

(56) References Cited

U.S. PATENT DOCUMENTS

| 5,797,134 | A  | * | 8/1998 | McMillan ............... | G06Q 40/08 |
| | | | | | 705/400 |
| 6,064,970 | A  |   | 5/2000 | Mcmillan et al. | |
| 9,147,353 | B1 | * | 9/2015 | Slusar .................... | G06Q 40/08 |
| 10,657,597 | B1 | * | 5/2020 | Billman ................. | G06Q 40/08 |
| 11,257,162 | B1 | * | 2/2022 | Saban .................... | G06Q 40/08 |

(Continued)

FOREIGN PATENT DOCUMENTS

JP    H11511581 A    10/1999
JP    2002149984 A    5/2002
(Continued)

OTHER PUBLICATIONS

International Search Report (PCT/ISA/210) and Written Opinion (PCT/ISA/237) dated Mar. 19, 2019, by the Japan Patent Office as the International Searching Authority for International Application No. PCT/JP2019/001227.

(Continued)

*Primary Examiner* — Robert R Niquette
(74) *Attorney, Agent, or Firm* — BUCHANAN INGERSOLL & ROONEY PC

(57) ABSTRACT

An information processing device acquires related information related to support information for supporting safe driving of a vehicle transmitted from the vehicle to one or more apparatuses among a roadside unit, another vehicle, and a mobile terminal device, and calculates a score of an owner of the vehicle based on the related information.

9 Claims, 10 Drawing Sheets

(56) References Cited

U.S. PATENT DOCUMENTS

| | | | |
|---|---|---|---|
| 2002/0128882 A1* | 9/2002 | Nakagawa | G06Q 30/02 705/4 |
| 2003/0216880 A1 | 11/2003 | Endoh | |
| 2006/0053038 A1* | 3/2006 | Warren | G06Q 40/08 705/4 |
| 2015/0032481 A1* | 1/2015 | Norling-Christensen | G06Q 40/08 705/4 |
| 2016/0288797 A1 | 10/2016 | Takahashi et al. | |
| 2018/8859820 | 3/2018 | Lection et al. | |
| 2018/0225963 A1* | 8/2018 | Kobayashi | G08G 1/09 |

FOREIGN PATENT DOCUMENTS

| | | |
|---|---|---|
| JP | 2002259708 A | 9/2002 |
| JP | 2002329070 A | 11/2002 |
| JP | 2003331390 A | 11/2003 |
| JP | 2004062874 A | 2/2004 |
| JP | 2009128486 A | 6/2009 |
| JP | 2010038959 A | 2/2010 |
| JP | 2016197308 A | 11/2016 |
| JP | 2017117178 A | 6/2017 |
| JP | 2018022277 A | 2/2018 |
| JP | 2018060520 A | 4/2018 |
| JP | 2018147211 A | 9/2018 |
| WO | 2005083605 A1 | 9/2005 |

OTHER PUBLICATIONS

Notice of Reasons for Refusal dated Jul. 5, 2022, issued in corresponding Japanese Patent Application No. 2020-566039, 8 pages including 4 pages of English Translation.

* cited by examiner

FIG.5

| TRAVEL DISTANCE[km] | DATA AMOUNT[Mbyte] | | |
|---|---|---|---|
| | H < 100 | 100 ≤ H < 50000 | H ≥ 50000 |
| D < 1000 | 0.9 | 1.0 | 1.1 |
| 1000 ≤ D < 5000 | 0.8 | 0.9 | 1.0 |
| 5000 ≤ D < 10000 | 0.7 | 0.8 | 0.9 |
| 10000 ≤ D < 20000 | 0.6 | 0.7 | 0.8 |
| D ≥ 20000 | 0.5 | 0.6 | 0.7 |

FIG.6

| TYPE | COEFFICIENT |
|---|---|
| SENSOR | 1.0 |
| MAP | 1.1 |
| POSITION | 1.2 |
| DESTINATION | 1.3 |
| BIOLOGICAL | 1.4 |

FIG.7

| PRICE RANGE [YEN] | COEFFICIENT |
|---|---|
| LESS THAN 10,000 YEN | 1.0 |
| MORE THAN OR EQUAL TO 10,000 YEN AND LESS THAN 20,000 YEN | 1.1 |
| MORE THAN OR EQUAL TO 20,000 YEN AND LESS THAN 100,000 YEN | 1.2 |
| MORE THAN OR EQUAL TO 100,000 YEN | 1.3 |

| TRANSMISSION DESTINATION | COEFFICIENT |
|---|---|
| ROADSIDE UNIT | 1.0 |
| VEHICLE | 1.0 |
| PEDESTRIAN | 1.1 |

| AUTOMATIC DRIVING LEVEL | COEFFICIENT |
|---|---|
| LEVEL 1 | 0.6 |
| LEVEL 2 | 0.7 |
| LEVEL 3 | 0.8 |
| LEVEL 4 | 0.9 |
| LEVEL 5 | 1.0 |

INFORMATION PROCESSING DEVICE

TECHNICAL FIELD

The present disclosure relates to an information processing device and an information processing system.

BACKGROUND ART

Conventionally, there have been known a method and a system for determining an automobile insurance fee based on monitoring, recording, and communication of data indicating driving characteristics of an operator and an automobile.

For example, Japanese Patent Laying-Open No. 2009-128486 (PTL 1) discloses an automobile insurance fee setting system. This system determines a safe driving level for each driver identifier based on information about the driving state of a vehicle and information about the travel environment of the vehicle, and calculates an automobile insurance fee for each driver identifier using a calculation equation for an insurance fee corresponding to the safe driving level.

CITATION LIST

Patent Literature

PTL 1: Japanese Patent Laying-Open No. 2009-128486

SUMMARY OF INVENTION

Technical Problem

In recent years, a vehicle-to-vehicle communication system which is a wireless communication system between vehicles, a vehicle-to-roadside unit communication system which is a wireless communication system between a vehicle and a roadside unit, a vehicle-to-pedestrian communication system which is a wireless communication system between a vehicle and a pedestrian terminal carried by a pedestrian, and the like are under development. Information exchanged between the vehicle and each of the roadside unit and the pedestrian terminal is used to support safe driving of a driver of the vehicle, for example.

In such a communication system, it is necessary to provide a variety of information from the vehicle or the pedestrian terminal to the outside. However, it is difficult to perceive the merit in providing information to the outside. Accordingly, it is conceivable that the owner of the vehicle (for example, the driver) or the pedestrian may not provide information actively, for example, may limit the contents of information to be transmitted to the outside. Since vehicle control is performed with limited information in this case, increase in accidents, decrease in the comfort of vehicle control, or the like may be caused. Therefore, there is a need to actively urge information provision to the outside.

Although PTL 1 considers calculating a reasonable insurance fee according to the safe driving level of the driver, PTL 1 neither teaches nor suggests a technique for satisfying the need described above.

An object in an aspect of the present disclosure is to provide an information processing device and an information processing system that can urge the owner of a vehicle to actively provide information to the outside.

Solution to Problem

An information processing device according to an embodiment includes: an acquisition unit to acquire related information related to support information for supporting safe driving of a vehicle transmitted from the vehicle to one or more apparatuses among a roadside unit, another vehicle, and a mobile terminal device; and a score calculation unit to calculate a score of an owner of the vehicle based on the related information.

An information processing device according to another embodiment includes an acquisition unit to acquire related information related to information of an owner of a vehicle transmitted from a mobile terminal device of the owner to one or more apparatuses among another vehicle and a roadside unit. The information of the owner is information about the owner who is walking which is utilized to support safe driving of the other vehicle. The information processing device further includes a score calculation unit to calculate a score to be given to the owner based on the related information.

An information processing device according to still another embodiment includes: an acquisition unit to acquire a travel time or a travel distance for which a vehicle has traveled by automatic driving within a predetermined period, the vehicle being communicable with one or more apparatuses among a roadside unit, another vehicle, and a mobile terminal device; and a score calculation unit to calculate a score to be given to an owner of the vehicle based on the travel time or the travel distance acquired by the acquisition unit.

An information processing system according to still another embodiment includes: a vehicle; one or more apparatuses among a roadside unit, another vehicle, and a mobile terminal device; and an information processing device. The information processing device includes an acquisition unit to acquire related information related to support information for supporting safe driving of the vehicle transmitted from the vehicle to the one or more apparatuses, and a score calculation unit to calculate a score of an owner of the vehicle based on the related information.

An information processing system according to still another embodiment includes: a mobile terminal device of an owner of a vehicle; one or more apparatuses among another vehicle and a roadside unit; and an information processing device. The information processing device includes an acquisition unit to acquire related information related to information of the owner transmitted from the mobile terminal device to the one or more apparatuses. The information of the owner is information about the owner who is walking which is utilized to support safe driving of the other vehicle. The information processing device further includes a score calculation unit to calculate a score to be given to the owner based on the related information.

Advantageous Effects of Invention

According to the present disclosure, it becomes possible to urge the owner of a vehicle to actively provide information to the outside.

BRIEF DESCRIPTION OF DRAWINGS

FIG. 5 is a view showing an example of an information table according to the first embodiment.

FIG. 6 is a view showing another example of the information table according to the first embodiment.

FIG. 7 is a view showing another example of the information table according to the first embodiment.

DESCRIPTION OF EMBODIMENTS

Figure 1:
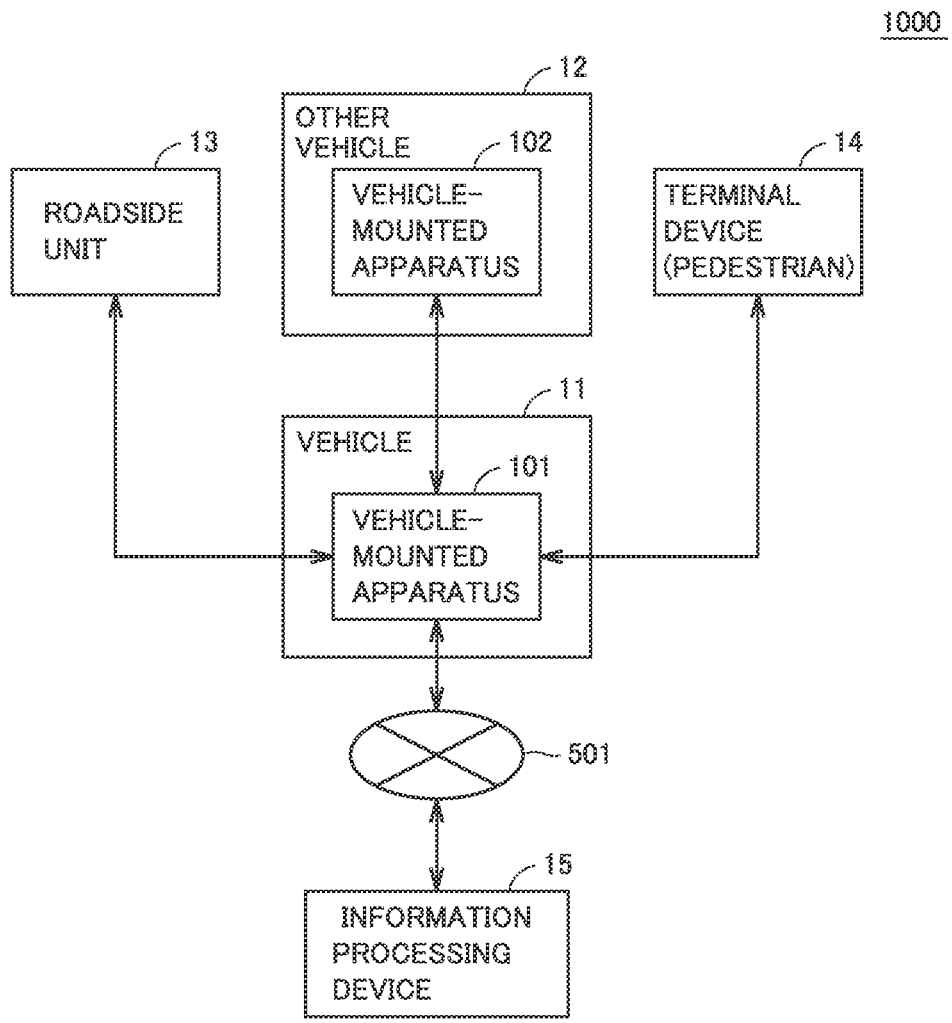
FIG. 1 is a view showing an overall configuration of an information processing system according to a first embodiment.

Hereinafter, embodiments of the present disclosure will be described with reference to the drawings. In the description below, identical parts will be designated by the same reference numerals. Since their names and functions are also the same, the detailed description thereof will not be repeated.

First Embodiment

<Overall Configuration>

FIG. 1 is a view showing an overall configuration of an information processing system 1000 according to a first embodiment. Referring to FIG. 1, information processing system 1000 is a communication system applied to the Intelligent Transport Systems (ITS), for example.

Information processing system 1000 includes a vehicle 11, another vehicle 12, a roadside unit 13, a terminal device 14 carried by a pedestrian, an information processing device 15, and a network 501.

In information processing system 1000, vehicle 11 can mutually wirelessly communicate with other vehicle 12, roadside unit 13, and terminal device 14. Specifically, vehicle-to-roadside unit communication between vehicle 11 and roadside unit 13, vehicle-to-vehicle communication between vehicle 11 and other vehicle 12, and vehicle-to-pedestrian communication between vehicle 11 and the pedestrian's terminal device 14 can be performed.

Roadside unit 13 is placed on a roadside, at an intersection, or the like. Roadside unit 13 includes a communication apparatus placed for the vehicle-to-roadside unit communication, a traffic light, or a communication apparatus placed with being attached to a traffic sign. Roadside unit 13 transmits, to vehicle 11, information for supporting safe driving of a driver of vehicle 11. This information includes information about lighting of the traffic light, information about road regulation, information about the shape of the intersection, or the like.

Terminal device 14 is a terminal device carried by the pedestrian, and is a smartphone, for example. However, terminal device 14 can be implemented as any apparatus having a communication function. For example, terminal device 14 is a device which can be carried by the pedestrian, such as a tablet computer, a wearable device, or the like.

Vehicle 11 and other vehicle 12 are moving bodies traveling on a road, and examples thereof include an automobile, a motorized bicycle, a bicycle, and the like. A vehicle-mounted apparatus 101 and a vehicle-mounted apparatus 102 designed for the ITS are mounted in vehicle 11 and other vehicle 12, respectively. Vehicle-mounted apparatus 101 transmits support information for supporting safe driving of vehicle 11 to other vehicle 12, roadside unit 13, and terminal device 14. For example, vehicle-mounted apparatus 101 periodically transmits the support information. In the first embodiment, when it is not necessary to distinguish among other vehicle 12, roadside unit 13, and terminal device 14, these apparatuses are also collectively referred to as "another apparatus", for ease of description.

The support information includes sensor information acquired from various sensors mounted in vehicle 11, such as a speedometer, a monocular camera, a stereo camera, a laser radar, a millimeter wave radar, a LiDAR (Light Detection and Ranging), an ultrasonic sensor, and an infrared camera. Typically, the sensor information includes a vehicle speed, image information acquired from the cameras, sensed information of an obstacle or the like, for example. The sensor information is used to control driving of vehicle 11, such as avoidance of the obstacle, parking support, driving along a lane marker on the road, and the like.

Further, since the sensor information is transmitted from vehicle 11 to the other apparatus, the other apparatus can also perform control based on the sensor information acquired in vehicle 11. For example, by transmitting the image information acquired by the various cameras mounted in vehicle 11 to the other apparatus, the other apparatus can perform control based on the image information. Here, when the image information includes the image of the pedestrian who is in a blind spot for a driver of other vehicle 12, other vehicle 12 can perform various controls for preventing an accident with the pedestrian (for example, speed reduction, alerting to the driver, and the like). Roadside unit 13 can notify other vehicles other than vehicle 11 and other vehicle 12 of the presence of the pedestrian. The pedestrian's terminal device 14 can warn the pedestrian that other vehicle 12 is approaching.

Further, vehicle 11 may be equipped with a navigation device which detects a vehicle position on a map utilizing the GPS (Global Positioning System) and the quasi-zenith satellite system. In this case, the support information may include map information, vehicle position information, destination information, a travel route, traffic congestion information, and roadwork information provided by the navigation device. Since vehicle 11 transmits these pieces of information to the other apparatus, the other apparatus can also recognize the position of vehicle 11, the travel route, and the like, which can prevent an accident between vehicle 11 and other vehicle 12 or the pedestrian.

Furthermore, the support information may include biological information of the driver of vehicle 11. The biological information includes brain wave information, a heart rate, the amount of perspiration, and feeling information, for example. The brain wave information includes data indicating a basic rhythm including frequency bands such as an α wave and a β wave. Typically, the biological information is acquired from a wearable device worn by the driver.

A processor of vehicle-mounted apparatus 101 can determine what kind of information is included in the support information, using a registered information table indicating information registered as the support information. Specifically, when information P is registered in the information table as the support information, the processor of vehicle-mounted apparatus 101 determines that information P is the support information. Further, the processor of vehicle-mounted apparatus 101 may register new type of information as the support information, or may exclude information already registered as the support information from the registered information table.

A driving control device of vehicle 11 performs driving control according to the driver's condition based on the driver's biological information. For example, the driving control device checks sleepiness during driving based on the driver's heart rate, and upon sensing that the driver is dozing, the driving control device performs driving control such as sounding of an alarm, switching to an automatic driving mode, and the like. Further, since the driver's biological information is transmitted to the other apparatus, the other apparatus can also perform control based on the condition of the driver of vehicle 11. For example, when other vehicle 12 senses that the driver of vehicle 11 is dozing based on the driver's heart rate, other vehicle 12 can perform various controls for preventing an accident with vehicle 11 (for example, speed reduction, alerting to the driver, and the like). Roadside unit 13 can notify the other vehicles that the driver is dozing. Terminal device 14 can warn the pedestrian that vehicle 11 is approaching.

Since the support information is utilized for the driving control of vehicle 11 and is also utilized in the other apparatus as described above, the incidence of an accident between vehicle 11, other vehicle 12, and the pedestrian can be decreased. Thus, in information processing system 1000, safe driving of the driver of vehicle 11 is supported by performing the vehicle-to-roadside unit communication, the vehicle-to-vehicle communication, and the vehicle-to-pedestrian communication.

Vehicle-mounted apparatus 101 of vehicle 11 can communicate with information processing device 15 via network 501. Network 501 includes various networks such as the Internet, a mobile terminal communication network, infrared ray communication, Bluetooth (registered trademark), a wireless LAN (local area network), and the like. For network 501, a wired communication method may be employed, or a wireless communication method may be employed.

Information processing device 15 is a personal computer, for example. However, information processing device 15 may be another device such as a smartphone or a tablet terminal device. It should be noted that information processing device 15 only has to have a computation function and a communication function, and may be a device which does not have a display function.

Information processing device 15 calculates a score to be given to a user X who is the owner of vehicle 11, based on information transmitted from vehicle-mounted apparatus 101. This score is an indicator indicating how much contribution has been made (that is, the degree of contribution) to safe and comfortable driving support in the ITS, and typically, user X can obtain a greater merit as this score is higher. For example, when the score is utilized for a discount rate for an automobile insurance fee of vehicle 11, user X can obtain a monetary merit that the discount rate for the automobile insurance fee becomes higher (that is, the automobile insurance fee becomes less expensive) as the score is higher.

The information transmitted from vehicle-mounted apparatus 101 is information related to the support information for supporting safe driving of vehicle 11 (hereinafter also simply referred to as "related information"). Although the detail will be described later, examples of the related information include the data amount, the type, and the transmission destination of the support information transmitted from vehicle 11 to the other apparatus, the price of a device that has generated the support information, and the like.

For example, it is considered that the degree of contribution to safe and comfortable driving support is higher as the data amount of the support information transmitted from vehicle-mounted apparatus 101 to the other apparatus is larger. Accordingly, information processing device 15 calculates the score such that the score becomes more advantageous to user X as the data amount of the support information is larger. That is, information processing device 15 gives a higher score to user X as the data amount of the support information is larger. When the score is utilized for the discount rate for the automobile insurance fee of vehicle 11, user X can obtain a great monetary merit. Accordingly, user X attempts to actively transmit the support information from vehicle 11 to the other apparatus.

Since information processing system 1000 can urge active information provision from vehicle 11 to the other apparatus, information processing system 1000 can decrease the incidence of an accident and increase the comfort of vehicle control.

<Hardware Configuration>

(Vehicle-Mounted Apparatus)

Figure 2:
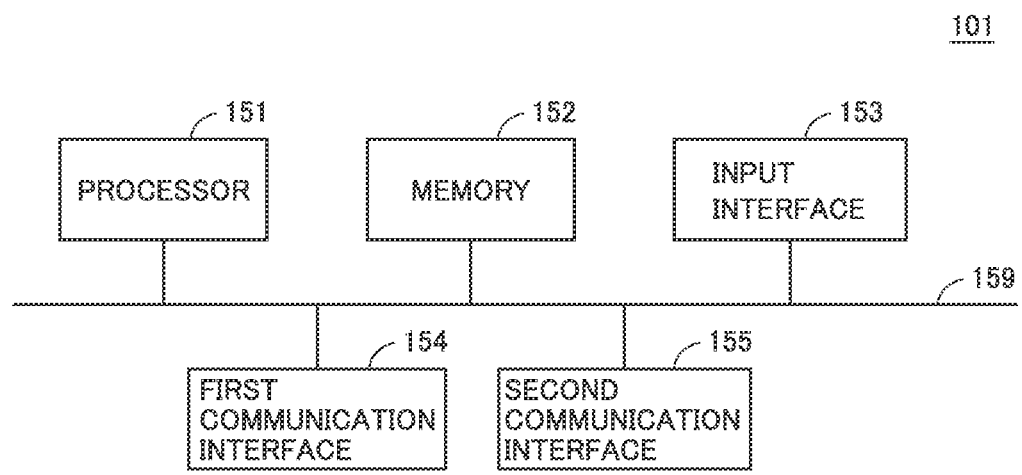
FIG. 2 is a block diagram showing an example of a hardware configuration of a vehicle-mounted apparatus according to the first embodiment.

FIG. 2 is a block diagram showing an example of a hardware configuration of vehicle-mounted apparatus 101 according to the first embodiment. Referring to FIG. 2, vehicle-mounted apparatus 101 includes a processor 151, a memory 152, an input interface 153, a first communication interface 154, and a second communication interface 155, as a main hardware configuration. These are connected to communicate with one another via an internal bus 159.

Processor 151 is typically a CPU (Central Processing Unit). Processor 151 controls operation of each component of vehicle-mounted apparatus 101 by reading and executing a program stored in memory 152. More specifically, processor 151 implements each processing of vehicle-mounted apparatus 101 described later, by executing the program. It should be noted that the hardware may be replaced by an FPGA (Field Programmable Gate Array), an ASIC (Application Specific Integrated Circuit), another circuit having a computation function, or the like, other than the CPU.

Memory 152 is implemented by a RAM (Random Access Memory), a ROM (Read-Only Memory), a flash memory, or the like. Memory 152 stores the program to be executed by processor 151, data to be used by processor 151, or the like.

Input interface 153 receives input of the support information acquired by the various devices (for example, the various sensors, the navigation device) mounted in vehicle 11. Further, input interface 153 receives input of the biological information of the driver of vehicle 11 acquired by the wearable device as the support information.

First communication interface 154 is a communication interface for exchanging various types of data between vehicle-mounted apparatus 101 and the other apparatus. Specifically, first communication interface 154 can wirelessly communicate with roadside unit 13, vehicle-mounted apparatus 102 of other vehicle 12, and terminal device 14, using a non-directional antenna.

Second communication interface 155 is connected to network 501, and transmits and receives a signal for communication. Thereby, vehicle-mounted apparatus 101 can communicate with information processing device 15 via network 501 such as the Internet or the mobile terminal communication network.

(Information Processing Device)

Figure 3:
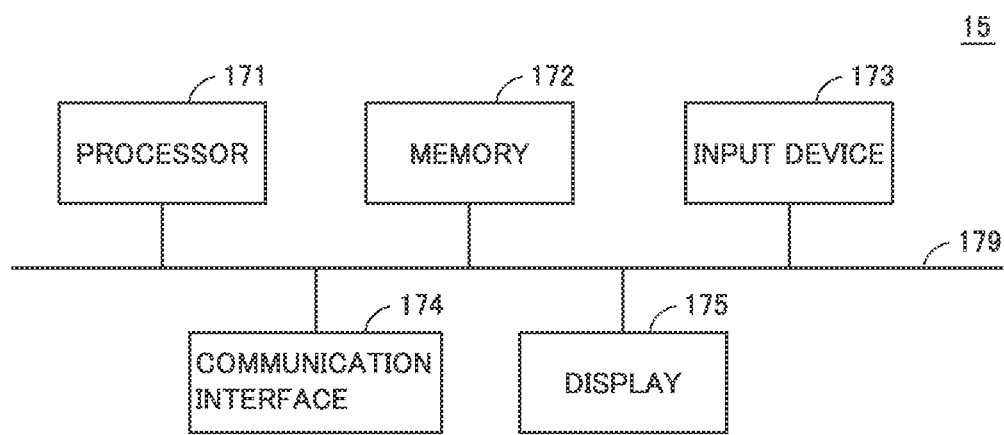
FIG. 3 is a block diagram showing an example of a hardware configuration of an information processing device according to the first embodiment.

FIG. 3 is a block diagram showing an example of a hardware configuration of information processing device 15 according to the first embodiment. Referring to FIG. 3, information processing device 15 includes a processor 171 for performing a variety of processing, a memory 172 for storing a program to be executed by the processor, data, or the like, an input device 173 for receiving operation input from the user, a communication interface 174 for communicating with vehicle-mounted apparatus 101, and a display 175, as a main hardware configuration. These are connected to communicate with one another via an internal bus 179. It should be noted that processor 171 may be replaced by an FPGA or the like, other than a CPU. That is, information processing device 15 may be constituted using an FPGA.

(Roadside Unit)

Roadside unit 13 may be any unit that can provide information processing as described later as a whole, and a known hardware configuration is employed. For example, roadside unit 13 includes a processor, a memory, various sensors for detecting the circumstances of the location where roadside unit 13 is placed, a camera for capturing the image of the location, and a communication interface for communicating with vehicle 11.

<Operation Outline>

Figure 4:
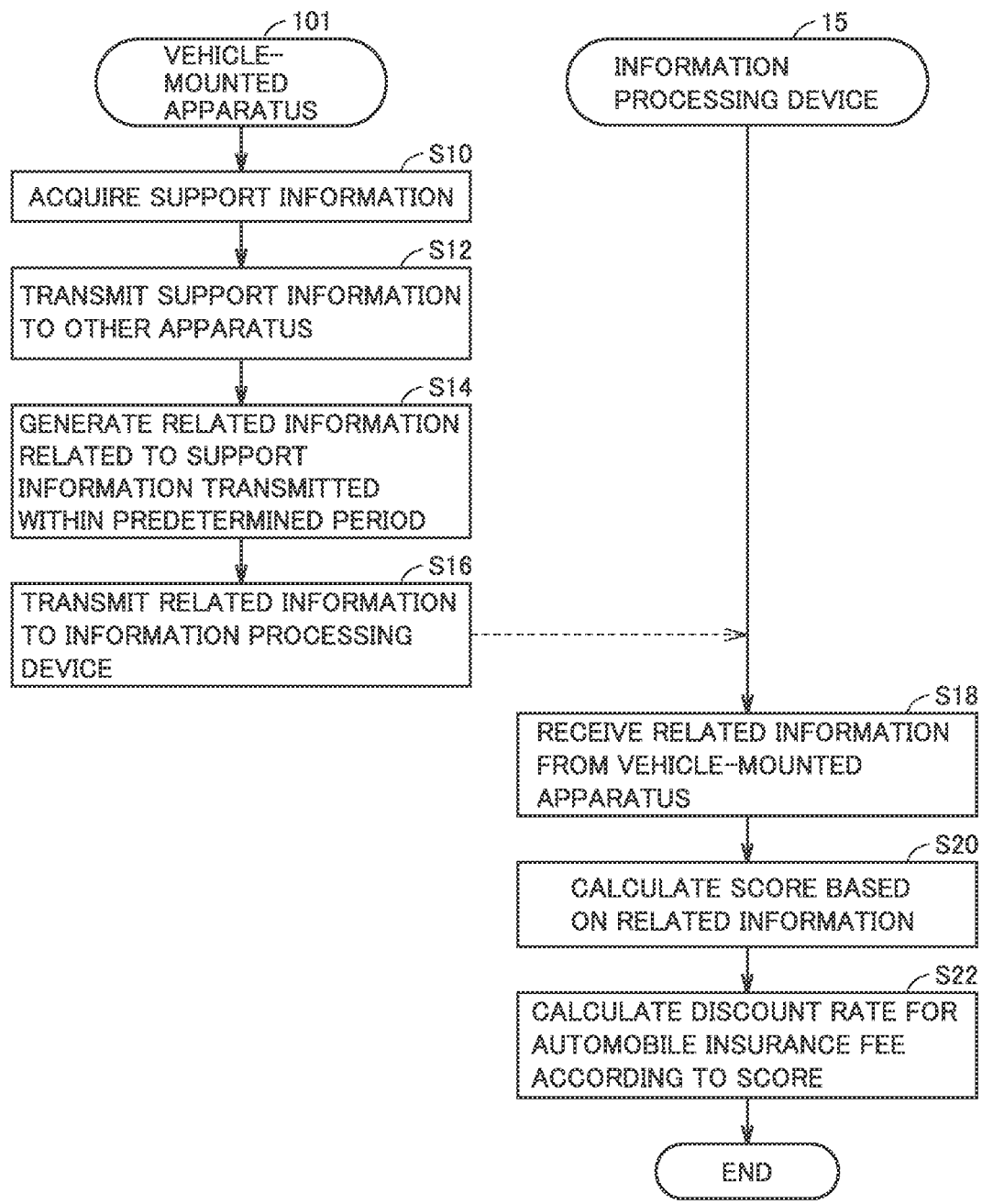
FIG. 4 is a flowchart for illustrating an example of an operation outline of the information processing system according to the first embodiment.

FIG. 4 is a flowchart for illustrating an example of an operation outline of information processing system 1000 according to the first embodiment. Typically, each step for vehicle-mounted apparatus 101 is performed by processor 151, and each step for information processing device 15 is performed by processor 171.

Referring to FIG. 4, vehicle-mounted apparatus 101 acquires support information from the various devices mounted in vehicle 11 and the driver's wearable device (step S10). Vehicle-mounted apparatus 101 transmits the acquired support information to the other apparatus via first communication interface 154 (step S12).

Vehicle-mounted apparatus 101 generates related information related to the support information transmitted within a predetermined period (for example, within the last one month, or within the last one year) (step S14). For example, vehicle-mounted apparatus 101 calculates a data amount of the support information transmitted within the predetermined period, and generates the calculated data amount as the related information. It should be noted that, when the support information includes sensor information, biological information, and position information, a total data amount of these three pieces of information serves as the data amount of the support information.

Subsequently, vehicle-mounted apparatus 101 transmits the generated related information to information processing device 15 via second communication interface 155 (step S16). It should be noted that vehicle-mounted apparatus 101 may transmit the related information with a vehicle ID (or a user ID of the owner of vehicle 11) being associated therewith, to allow information processing device 15 to identify that the related information is associated with vehicle 11.

Information processing device 15 receives the related information transmitted from vehicle-mounted apparatus 101, via communication interface 174 (step S18). Information processing device 15 calculates a score to be given to user X who is the owner of vehicle 11, based on the related information (step S20). It should be noted that the detail of the score calculation method will be described later.

Subsequently, information processing device 15 calculates a discount rate for an automobile insurance fee according to the score (step S22), and terminates the processing. For example, information processing device 15 calculates the discount rate by referring to an information table indicating the relation between the score and the discount rate. Typically, it is considered that user X's degree of contribution to safe driving support is higher as the score is higher. Accordingly, as the information table, a table in which the discount rate for the automobile insurance fee becomes higher as the score is higher is employed.

It should be noted that information processing device 15 may display the calculated score and discount rate on display 175. Further, information processing device 15 may transmit the calculated score and discount rate to user X's terminal device (for example, smartphone) or vehicle-mounted apparatus 101, via communication interface 174. Thereby, user X can recognize the merit he or she obtains.

<Score Calculation Method>

Here, a plurality of score calculation methods will be described.

(Data Amount)

A configuration in which the score is calculated by focusing on the data amount of the support information transmitted from vehicle-mounted apparatus 101 to the other apparatus (hereinafter also simply referred to as the "data amount of the support information") will be described with reference to the flowchart of FIG. 4 as appropriate.

In step S14 of FIG. 4, processor 151 of vehicle-mounted apparatus 101 generates the data amount of the support information transmitted to the other apparatus within the predetermined period (for example, information of 2000 Mbytes or the like), as the related information. Subsequently, in step S16, processor 151 transmits the data amount of the support information, as the related information, to information processing device 15. In step S18, processor 171 of information processing device 15 receives the data amount of the support information. In step S20, processor 171 calculates the score such that the score becomes more advantageous to user X as the data amount is larger.

Typically, processor 171 gives a higher score to user X as the data amount of the support information is larger, using a predetermined calculation equation. This is because it is considered that, as the data amount of the support information transmitted from vehicle-mounted apparatus 101 is larger, more information is exchanged between vehicle-mounted apparatus 101 and the other apparatus, and the degree of contribution to safe and comfortable driving support is higher. The predetermined calculation equation may be a calculation equation with which the score is continuously changed according to the data amount, or may be a calculation equation with which the score is changed in a step-wise manner according to the data amount.

As another example, the score may be calculated using a data amount obtained by normalizing the data amount of the support information by a travel distance of vehicle 11. In this case, in step S16, processor 151 of vehicle-mounted apparatus 101 transmits the travel distance of vehicle 11 measured by an odometer, in addition to the data amount of the support information. It should be noted that the travel distance of vehicle 11 does not have to be transmitted simultaneously with the data amount of the support information, and may be transmitted beforehand to information processing device 15.

Subsequently, in step S20, processor 171 of information processing device 15 calculates the score using the data amount obtained by normalizing the data amount of the received support information by the travel distance of vehicle 11. Specifically, processor 171 calculates the normalized data amount by dividing the data amount of the support information by the travel distance of vehicle 11 (that is, normalized data amount=data amount/travel distance). Processor 171 calculates the score such that the score becomes more advantageous to user X as the normalized data amount is larger. In this example, information processing device 15 can calculate the score that is independent of the travel distance of vehicle 11.

As still another example, the score may be calculated using a coefficient determined from the relation between the data amount of the support information and the travel distance.

FIG. 5 is a view showing an example of an information table 301 according to the first embodiment. Referring to FIG. 5, information table 301 indicates coefficients determined by the relation between the data amount of the support information and the travel distance. The travel distance and the data amount of the support information are represented by D [km] and H [Mbyte], respectively. Travel distance D is classified into five groups according to the length thereof, and data amount H is classified into three groups according to the size thereof.

Processor 171 calculates the score by determining a coefficient indicated in information table 301 based on the data amount of the support information and the travel distance, and multiplying a reference score E by the coefficient. For example, when travel distance D is 2000 [km] and the data amount of the support information is 20000 [Mbyte], the coefficient is determined from information table 301 as 0.9. Accordingly, the score is 0.9 times reference score E.

Here, referring to information table 301, since the coefficient becomes smaller as the travel distance is longer, the score also becomes smaller as the travel distance is longer. This is based on a view that, as the travel distance is longer, the incidence of an accident related to the vehicle increases, and the degree of contribution to safe and comfortable driving support is lower. On the other hand, since the coefficient becomes larger as the data amount of the support information is larger, the score also becomes larger as the data amount of the support information is larger. This is based on a view that, as the data amount of the support information is larger, the incidence of an accident related to the vehicle decreases, and the degree of contribution to safe and comfortable driving support is higher.

When travel distance D is less than 1000 km and data amount H is more than or equal to 50000 Mbytes, the coefficient is 1.1, which is the largest. This means that, since the data amount is very large despite the short travel distance, the degree of contribution to safe and comfortable driving support is extremely high. On the other hand, when travel distance D is more than or equal to 20000 km and data amount H is less than 100 Mbytes, the coefficient is 0.5, which is the smallest. This means that, since the data amount is very small despite the long travel distance, the degree of contribution is extremely low.

In this manner, processor 171 calculates the score such that the score becomes more advantageous to user X as the data amount of the transmitted support information is larger, and as the travel distance of vehicle 11 is shorter, by referring to information table 300. Accordingly, even if the travel distance of vehicle 11 is long, user X can obtain a certain merit when the data amount of the transmitted support information is large.

It should be noted that, when the score is applied to the discount rate for the automobile insurance fee, the automobile insurance fee becomes less expensive as the score is higher. A high score means a high degree of contribution to safe driving support, and this also leads to a decrease in the incidence of accidents in the entire society. Accordingly, it is considered that making the automobile insurance fee less expensive as the score is higher also provides a certain merit to an automobile insurance company.

With the score calculation method using the data amount of the support information, a score giving system that is easy to understand for user X can be established. Further, since the information transmitted from vehicle-mounted apparatus 101 to information processing device 15 is not the support information itself but the information indicating the data amount of the support information, large-capacity communication between vehicle-mounted apparatus 101 and information processing device 15 is not required.

(Type)

Next, a configuration in which the score is calculated by focusing on the type of the support information transmitted from vehicle-mounted apparatus 101 to the other apparatus will be described with reference to the flowchart of FIG. 4 as appropriate.

In step S14 of FIG. 4, processor 151 of vehicle-mounted apparatus 101 classifies the support information transmitted to the other apparatus within the predetermined period according to type, and generates each type information acquired as a result of classification, as the related information. Typically, the type information includes information indicating a type of the support information, and a data amount of the support information classified into that type.

For example, it is assumed that the support information is classified into five types: "sensor", "map", "position", "destination", and "biological". In this case, first type information includes information indicating the type "sensor", and a data amount of sensor information classified into the type "sensor" of the support information. Similarly, second type information includes information indicating the type "map", and a data amount of map information classified into the type "map". Third type information includes information indicating the type "position", and a data amount of position information classified into the type "position". Fourth type information includes information indicating the type "destination", and a data amount of destination information classified into the type "destination". Fifth type information includes information indicating the type "biological", and a data amount of biological information classified into the type "biological".

In step S16, processor 151 transmits the first to fifth type information, as the related information, to information processing device 15. In step S18, processor 171 of information processing device 15 receives the type information. In step S20, processor 171 calculates the score such that the score becomes more advantageous to user X as the degree of importance of the type information is higher.

Specifically, a predefined degree of importance is associated with the information indicating the type of the support information. For example, when the support information is classified into the five types described above, they are listed as the types "biological", "destination", "position", "map", and "sensor" in descending order of the degree of importance. Here, the degree of importance is set to be higher as the type information has a higher privacy, because user X may not restrict transmission of the sensor information having a low privacy but may restrict transmission of the biological information having a high privacy. By setting the degree of importance to be higher as transmission of the type information is more likely to be restricted, and giving a higher score, it is possible to urge active information provision even if the type information has a high privacy.

FIG. 6 is a view showing an information table 303 according to the first embodiment. Information table 303 indicates coefficients associated with the types of the support information. Referring to FIG. 6, the coefficient is set to be higher as the degree of importance of the type information is higher. Here, it is assumed that information processing device 15 receives the first type information related to the type "sensor" and the fourth type information related to the type "destination". It is also assumed that the data amount of the sensor information is F1 [Mbyte] and the data amount of the destination information is F2 [Mbyte]. In this case, processor 171 calculates a data amount G1 as expressed by the following equation (1).

$$G1=(1.0 \times F1)+(1.3 \times F2) \quad (1)$$

Processor 171 calculates a score according to data amount G1. Typically, the score is calculated to be higher as data amount G1 is larger. Accordingly, the score becomes higher as the data amount of the support information having a higher degree of importance is larger. It should be noted that, when processor 171 further receives the second type information related to the type "map", it is only necessary to add a multiplication value obtained by multiplying the data amount of the map information by the coefficient "1.1" to data amount G1 calculated by the equation (1). The same applies in the case where processor 171 receives the type information other than those described above.

In addition, processor 171 may calculate the score without using the data amount of the support information. Here, it is assumed that information processing device 15 receives the first type information related to the type "sensor" and the fourth type information related to the type "destination". Processor 171 calculates a score SC1 as expressed by the following equation (2), using a reference score E1.

$$SC1=1.0 \times E1+1.3 \times E1 \quad (2)$$

In this manner, the score becomes higher as the support information having a higher degree of importance is transmitted to the other apparatus. It should be noted that, when processor 171 further receives the second type information related to the type "map", it is only necessary to add a multiplication value obtained by multiplying reference score E1 by the coefficient "1.1" to score SC1 calculated by the equation (2). The same applies in the case where processor 171 receives the type information other than those described above.

Although the configuration in which the degree of importance is set from the viewpoint of privacy has been described above, the present disclosure is not limited to that configuration, and the degree of importance may be set from another viewpoint.

(Price of Device)

Next, a configuration in which the score is calculated by focusing on the price of the device that has generated the support information transmitted from vehicle-mounted apparatus 101 to the other apparatus will be described with reference to the flowchart of FIG. 4 as appropriate.

In step S14 of FIG. 4, processor 151 of vehicle-mounted apparatus 101 classifies the device that has generated the support information transmitted to the other apparatus within the predetermined period according to price range, and generates price information acquired as a result of classification, as the related information. Typically, the price information includes information indicating a price range of the device that has generated the support information, and a data amount of the support information generated by the device classified into the price range.

Specifically, processor 151 can determine the device that has generated the support information by confirming an output source of the support information received via input interface 153. For example, when processor 151 receives image information from the stereo camera, processor 151 can determine that the device that has generated the image information is the stereo camera. Then, processor 151 reads the price of the stereo camera stored beforehand in memory 152, and determines into which price range the stereo camera is classified. It should be noted that memory 152 stores the price of each device mounted in vehicle 11. This price may be reviewed periodically.

It is assumed that the device that has generated the support information is classified into a price range Qa of less than 10,000 yen, a price range Qb of more than or equal to 10,000 yen and less than 20,000 yen, a price range Qc of more than or equal to 20,000 yen and less than 100,000 yen, or a price range Qd of more than or equal to 100,000 yen, according to the price of the device. For example, when the price of the stereo camera is 30,000 yen, processor 151 classifies the stereo camera into price range Qc.

In this manner, processor 151 classifies the device that has generated the support information according to price range. Then, for each price range, processor 151 calculates a data amount of the support information generated by one or more devices classified into the price range. Thereby, the price information including the information indicating the price range of each device and the data amount of the support information generated by each device classified into that price range is generated.

In the case of the example described above, first price information includes information indicating price range Qa, and a data amount of the support information generated by each device classified into price range Qa. Similarly, second price information includes information indicating price range Qb, and a data amount of the support information generated by each device classified into price range Qb. Third price information includes information indicating price range Qc, and a data amount of the support information generated by each device classified into price range Qc. Fourth price information includes information indicating price range Qd, and a data amount of the support information generated by each device classified into price range Qd.

In step S16, processor 151 transmits the generated first to fourth price information, as the related information, to information processing device 15. In step S18, processor 171 of information processing device 15 receives each price information. In step S20, processor 171 calculates the score such that the score becomes more advantageous to user X as the price range is higher.

FIG. 7 is a view showing an information table 305 according to the first embodiment. Referring to FIG. 7, information table 305 indicates coefficients corresponding to the price ranges of the devices. The coefficient is set to be higher as the price range of the device is higher. Here, it is assumed that information processing device 15 receives the first price information corresponding to price range Qa and the third price information corresponding to price range Qc. It is also assumed that a total data amount of the support information generated by the devices classified into price range Qa is H1 [Mbyte], and a total data amount of the support information generated by the devices classified into price range Qc is H3 [Mbyte]. In this case, processor 171 calculates a data amount G2 as expressed by the following equation (3).

$$G2=(1.0 \times H1)+(1.2 \times H3) \quad (3)$$

Processor 171 calculates a score according to data amount G2. Typically, the score is calculated to be higher as data amount G2 is larger. Accordingly, the score becomes higher as the data amount of the support information generated by a device in a higher price range is larger. This is based on a view that safer vehicle control is performed as the support information acquired from a more expensive device is transmitted to the other apparatus in a larger amount.

In addition, processor 171 may calculate the score without using the total data amount. Here, it is assumed that information processing device 15 receives the first price information and the third price information. Processor 171 calculates a score SC2 as expressed by the following equation (4), using a reference score E2.

$$SC2=1.0 \times E2+1.2 \times E2 \quad (4)$$

In this manner, the score becomes higher as the support information generated by a device in a higher price range is transmitted to the other apparatus. Accordingly, it is considered that this can actively urge mounting of an expensive device in the vehicle and results in a decrease in the incidence of an accident.

(Transmission Destination)

Next, a configuration in which the score is calculated by focusing on the transmission destination of the support information transmitted from vehicle-mounted apparatus 101 will be described with reference to the flowchart of FIG. 4 as appropriate.

In step S14 of FIG. 4, processor 151 of vehicle-mounted apparatus 101 determines a transmission destination of the support information transmitted within the predetermined period, and generates transmission destination information acquired as a result of determination, as the related information. Typically, the transmission destination information includes information indicating the transmission destination of the support information, and a data amount of the support information transmitted to that transmission destination. The transmission destination is at least one of other vehicle 12, roadside unit 13, and terminal device 14, for example.

Processor 151 determines the transmission destination of the support information transmitted within the predetermined period. For example, processor 151 performs the determination based on identification information for identifying the transmission destination. It should be noted that processor 151 may determine the transmission destination by a known technique other than that. Subsequently, for each transmission destination, processor 151 calculates a data amount of the support information transmitted to the transmission destination. Thereby, the transmission destination information including the information indicating the transmission destination and the data amount of the support information transmitted to that transmission destination is generated.

For example, first transmission destination information includes information indicating that the transmission destination is other vehicle 12, and a data amount of the support information transmitted to other vehicle 12. Second transmission destination information includes information indicating that the transmission destination is roadside unit 13, and a data amount of the support information transmitted to roadside unit 13. Third transmission destination information includes information indicating that the transmission destination is terminal device 14, and a data amount of the support information transmitted to terminal device 14.

In step S16, processor 151 transmits the generated first to third transmission destination information, as the related information, to information processing device 15. In step S18, processor 171 of information processing device 15 receives each transmission destination information. In step S20, processor 171 calculates the score such that the score becomes more advantageous to user X as the degree of importance of the transmission destination is higher.

Figures 8, 9:
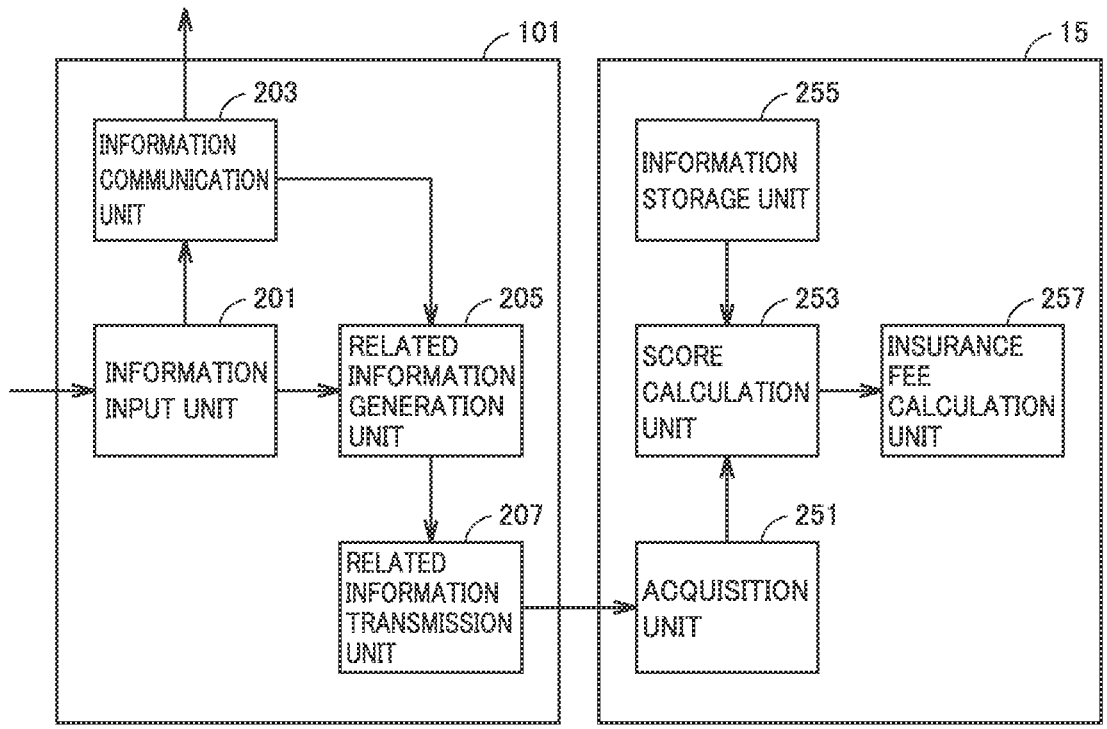
FIG. 8 is a view showing another example of the information table according to the first embodiment.
FIG. 9 is a schematic view showing a functional configuration of the vehicle-mounted apparatus and the information processing device according to the first embodiment.

FIG. 8 is a view showing an information table 307 according to the first embodiment. Referring to FIG. 8, information table 307 indicates coefficients associated with the transmission destinations. The coefficient is set to be higher as the degree of importance of the transmission destination is higher. Here, it is assumed that information processing device 15 receives the first to third transmission destination information. It is also assumed that data amounts of the support information transmitted to other vehicle 12, roadside unit 13, and terminal device 14 are J1, J2, and J3, respectively. In this case, processor 171 calculates a data amount G3 as expressed by the following equation (5).

$$G3=(1.0 \times J1)+(1.0 \times J2)+(1.1 \times J3) \quad (5)$$

Processor 171 calculates a score according to data amount G3. Typically, the score is calculated to be higher as data amount G3 is larger. Accordingly, the score becomes higher as the data amount of the support information transmitted to a transmission destination having a higher degree of importance is larger. This is based on a view that safer vehicle control is performed as the support information is transmitted to a transmission destination having a higher degree of importance in a larger amount.

In addition, although three transmission destinations are set in the above description, transmission destinations may be set in a further classified manner. For example, transmission destinations may be set according to the vehicle type of other vehicle 12, the placed location of roadside unit 13, the type of terminal device 14, and the like. Since a large number of transmission destinations are set in this case, processor 171 may calculate the score without using the data amount.

Here, it is assumed that information processing device 15 receives n pieces of transmission destination information (where n is an integer more than or equal to 1), and n-th transmission destination information includes information indicating a transmission destination Kn. It is also assumed that coefficients of transmission destinations K1 to Kn are represented by a1 to an (where an >0), respectively. In this case, processor 171 calculates a score SC3 as expressed by the following equation (6), using a reference score E3.

$$SC3 = a1 \times E3 + a2 \times E3 + \ldots + an \times E3 \qquad (6)$$

In this manner, the score becomes higher as the support information is transmitted to more transmission destinations. Therefore, it is considered that the transmission destinations of the support information are less likely to be restricted, which leads to a decrease in the incidence of an accident as a result.

(Utilization of Estimation Model)

Information processing device 15 may calculate the score of user X using a learned estimation model. The estimation model is stored beforehand in memory 172 of information processing device 15.

The estimation model is established based on a learned model that defines a network structure and corresponding parameters. Specifically, by inputting the data amount of the support information, the travel distance of vehicle 11, the type of the support information, the price of the device that has generated the support information, and the transmission destination of the support information to the estimation model, computation processing defined by the estimation model is performed, and the score of user X is calculated as an estimation result.

The estimation model is a learned model obtained by performing known learning processing (for example, deep learning) using a data set for learning. The data set for learning is, for example, a data set of the data amount of support information transmitted from a vehicle of another user different from user X, the travel distance of the vehicle, the type of the support information, the price of a device that has generated the support information, and the transmission destination of the support information, and the score determined based on the incidence of an accident of the vehicle of the other user. Such a data set for learning is prepared for each of a plurality of users.

The estimation model is optimized such that a score indicating user X's degree of contribution can be output based on the data amount of the support information, the travel distance of vehicle 11, the type of the support information, the price of the device that has generated the support information, and the transmission destination of the support information, by the learning processing using many data sets for learning.

It should be noted that the estimation model may be optimized such that a score indicating user X's degree of contribution can be output based on at least one of the data amount of the support information, the travel distance of vehicle 11, the type of the support information, the price of the device that has generated the support information, and the transmission destination of the support information. In this case, the data set for learning is, for example, a data set of at least one of the data amount of the support information transmitted from the vehicle of the other user, the travel distance of the vehicle, the type of the support information, the price of the device that has generated the support information, and the transmission destination of the support information, and the score determined based on the incidence of an accident of the vehicle of the other user.

As described above, information processing device 15 can calculate the score of user X from the correlation between at least one of the data amount of the support information, the travel distance of the vehicle, the type of the support information, the price of the device that has generated the support information, and the transmission destination of the support information, and the degree of contribution.

<Functional Configuration>

FIG. 9 is a schematic view showing a functional configuration of vehicle-mounted apparatus 101 and information processing device 15 according to the first embodiment. Referring to FIG. 9, vehicle-mounted apparatus 101 includes an information input unit 201, an information communication unit 203, a related information generation unit 205, and a related information transmission unit 207. Typically, these functions are implemented when processor 151 executes programs stored in memory 152. It should be noted that some or all of these functions may be implemented by using dedicated circuits.

Information processing device 15 includes an acquisition unit 251, a score calculation unit 253, and an insurance fee calculation unit 257. Typically, these functions are implemented when processor 171 executes programs stored in memory 172. It should be noted that some or all of these functions may be implemented by using dedicated circuits. Information processing device 15 further includes an information storage unit 255 implemented by memory 172.

Information input unit 201 of vehicle-mounted apparatus 101 receives input of the support information detected by each device mounted in vehicle 11. It should be noted that information input unit 201 acquires information of the output source of the support information. Information communication unit 203 transmits the support information to one or more apparatuses among roadside unit 13, other vehicle 12, and terminal device 14, via first communication interface 154. Information communication unit 203 acquires, from the other apparatus, identification information indicating the other apparatus.

Related information generation unit 205 generates related information related to the support information transmitted from information communication unit 203 to the other apparatus within a predetermined period (for example, within the last one month, or within the last one year). Related information transmission unit 207 transmits the related information generated by related information generation unit 205 to information processing device 15, via second communication interface 155.

Acquisition unit 251 of information processing device 15 acquires (that is, receives) the related information related to the support information for supporting safe driving of vehicle 11, from related information transmission unit 207. Acquisition unit 251 outputs the acquired related information to score calculation unit 253. Score calculation unit 253 calculates a score of the owner of vehicle 11 (that is, user X) based on the related information. Insurance fee calculation unit 257 calculates a discount rate for an automobile insurance fee of vehicle 11 according to the score of user X. Typically, the discount rate becomes higher as the score of user X is higher. In the following, a more specific functional configuration of related information generation unit 205 and score calculation unit 253 will be described.

In a first example, related information generation unit 205 calculates a data amount of the support information transmitted to the other apparatus within the predetermined period, and generates the data amount as the related information. In an aspect, score calculation unit 253 calculates a score such that the score becomes more advantageous to user X as the data amount of the support information is larger.

In another aspect, score calculation unit 253 calculates a normalized data amount by dividing the data amount of the support information by the travel distance of the vehicle, and calculates a score such that the score becomes more advantageous to user X as the normalized data amount is larger. In still another aspect, score calculation unit 253 calculates a score such that the score becomes more advantageous to user X as the data amount of the support information is larger, and as the travel distance of vehicle 11 is shorter, by using information table 301 shown in FIG. 5. It should be noted that, typically, information indicating the travel distance of vehicle 11 is transmitted from related information transmission unit 207 together with the related information, and is acquired by acquisition unit 251.

In a second example, related information generation unit 205 classifies the support information according to type, and generates type information acquired as a result of classification, as the related information. Specifically, related information generation unit 205 generates the type information including information indicating a type of the support information and a data amount of the support information classified into that type.

Score calculation unit 253 calculates a score such that the score becomes more advantageous to user X as the degree of importance of the information indicating the type is higher. Specifically, score calculation unit 253 calculates the score of user X according to data amount G1 calculated using the equation (1) described above. Further, score calculation unit 253 may calculate the score of user X using a calculation equation as expressed by the equation (2).

In a third example, related information generation unit 205 classifies a device that has generated the support information according to price range, and generates price information acquired as a result of classification, as the related information. Specifically, related information generation unit 205 determines the device that has generated the support information based on information of the output source of the support information, reads the price of the device from memory 152, and classifies the device into a price range corresponding to the price thereof. Then, related information generation unit 205 generates the price information including information indicating the price range of the device that has generated the support information and a data amount of the support information generated by the device classified into that price range.

Score calculation unit 253 calculates a score such that the score becomes more advantageous to user X as the price range of the device that has generated the support information is higher. Specifically, score calculation unit 253 calculates the score of user X according to data amount G2 calculated using the equation (3) described above. Further, score calculation unit 253 may calculate the score of user X using a calculation equation as expressed by the equation (4).

In a fourth example, related information generation unit 205 determines a transmission destination of the support information based on identification information of the other apparatus, and generates transmission destination information acquired as a result of determination, as the related information. The transmission destination information includes information indicating the transmission destination, and a data amount of the support information transmitted to that transmission destination.

Score calculation unit 253 calculates a score such that the score becomes more advantageous to user X as the degree of importance of the transmission destination of the support information is higher. Specifically, score calculation unit 253 calculates the score of user X according to data amount G3 calculated using the equation (5) described above. Further, score calculation unit 253 may calculate the score of user X using a calculation equation as expressed by the equation (6).

In a fifth example, related information generation unit 205 generates related information including one or more pieces of information among the data amount of the support information, information indicating the type of the support information, the price range of the device that has generated the support information, and the transmission destination of the support information. Related information transmission unit 207 transmits the related information and the travel distance of vehicle 11 to information processing device 15. These pieces of information are acquired by acquisition unit 251.

Score calculation unit 253 inputs at least one piece of information among the travel distance of vehicle 11 and the one or more pieces of information to the learned estimation model stored in information storage unit 255, and thereby calculates the score to be given to user X. The estimation model is subjected to learning processing using a data set for learning, such that, upon receiving the at least one piece of information, the estimation model outputs the score to be given to user X as an estimation result.

<Advantages>

According to the first embodiment, by providing user X who is the owner of vehicle 11 with the merit in transmitting the support information from vehicle 11 to the other apparatus, the user is urged to provide information more actively, which can decrease the incidence of an accident and increase the comfort of vehicle control as a result.

Second Embodiment

While the first embodiment described above describes the configuration in which the support information is provided from vehicle 11 to the other apparatus, a second embodiment will describe a configuration in which information about user X who is walking is provided from a terminal device of user X to other vehicle 12 and roadside unit 13.

<Overall Configuration>

Figure 10:
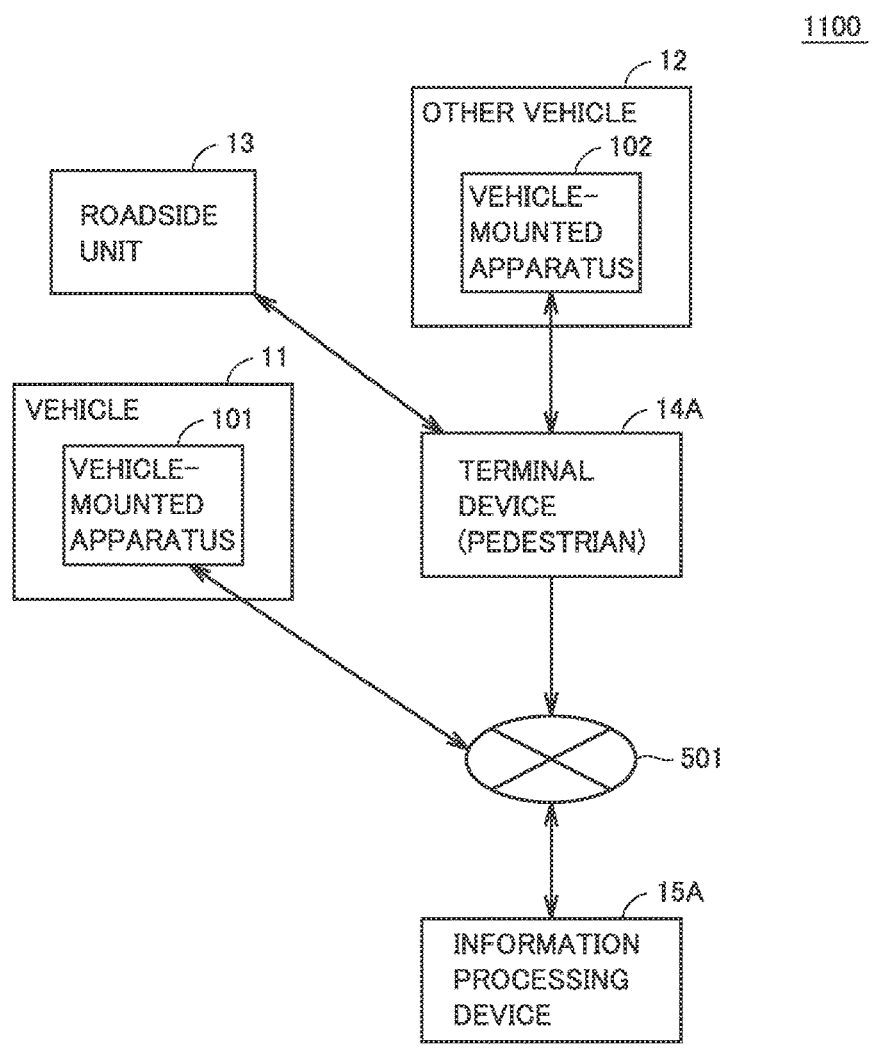
FIG. 10 is a view showing an overall configuration of an information processing system according to a second embodiment.

FIG. 10 is a view showing an overall configuration of an information processing system 1100 according to a second embodiment. Referring to FIG. 10, information processing system 1100 includes vehicle 11, other vehicle 12, roadside unit 13, a terminal device 14A carried by user X who is the owner of vehicle 11, an information processing device 15A, and network 501. For the features of information processing system 1100 which are the same as those of information processing system 1000, the detailed description thereof will not be provided.

In information processing system 1100, terminal device 14A can mutually wirelessly communicate with other vehicle 12 and roadside unit 13. Further, terminal device 14A can communicate with information processing device 15A via network 501.

In the first embodiment, user X obtains a merit by providing the support information from his or her vehicle 11 to the other apparatus, whereas in the second embodiment, user X obtains a merit by providing his or her information from terminal device 14A during walking. The walking means walking including a pause or a change of direction, for example. It should be noted that the walking also includes running.

Specifically, terminal device 14A transmits the information of user X who is walking (hereinafter also referred to as "pedestrian information") to at least one apparatus among other vehicle 12 and roadside unit 13. The pedestrian information is information about user X which is utilized to support safe driving of other vehicle 12. The pedestrian information is information indicating user X's condition and action, and includes user X's position information, walking speed, destination, biological information, and the like. The destination is a destination registered in a map application installed in terminal device 14A, for example. In the second embodiment, when it is not necessary to distinguish between other vehicle 12 and roadside unit 13, these apparatuses are also collectively referred to as an "external apparatus", for ease of description.

Upon receiving setting input for transmitting the pedestrian information from user X, terminal device 14A periodically transmits the pedestrian information. It should be noted that, when it is detected by an acceleration sensor that user X is not moving for a certain period of time, terminal device 14A may determine that user X is not walking and may stop transmission of the pedestrian information.

Since the pedestrian information is provided to other vehicle 12, other vehicle 12 can perform control according to the action, condition, and the like of user X who is a pedestrian. In addition, since the pedestrian information is provided to roadside unit 13, roadside unit 13 can notify other vehicle 12 or the other vehicles of user X's action and condition. This can decrease an accident which may occur between other vehicle 12 and the pedestrian, supporting safe driving of other vehicle 12.

Information processing device 15A calculates a score to be given to user X who is the owner of vehicle 11, based on information transmitted from terminal device 14A. The information transmitted from terminal device 14A is related information R related to the pedestrian information. Related information R is the data amount, the type, the transmission destination, or the like of the pedestrian information transmitted from terminal device 14A to at least one apparatus among other vehicle 12 and roadside unit 13.

For example, it is considered that the degree of contribution to driving support is higher as the data amount of the pedestrian information transmitted from terminal device 14A to the other apparatus is larger. Accordingly, information processing device 15A calculates the score such that the score becomes more advantageous to user X as the data amount of the pedestrian information is larger. The score calculation method according to the second embodiment is basically the same as the score calculation method according to the first embodiment. When the score is utilized for a discount rate for an automobile insurance fee of vehicle 11, user X can obtain a great monetary merit. Thereby, the pedestrian information is actively transmitted from terminal device 14A to the external apparatus.

<Hardware Configuration>

Figure 11:
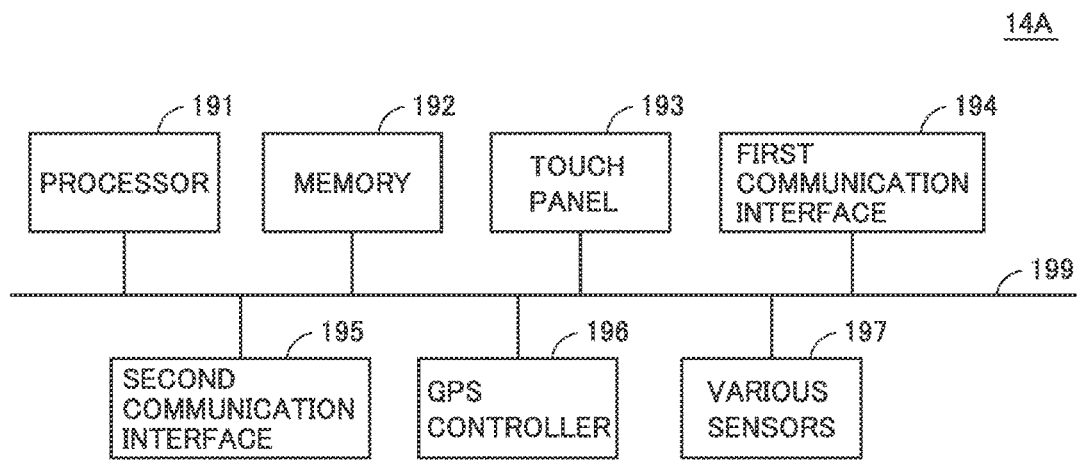
FIG. 11 is a block diagram showing an example of a hardware configuration of a terminal device according to the second embodiment.

FIG. 11 is a block diagram showing an example of a hardware configuration of terminal device 14A according to the second embodiment. Referring to FIG. 11, terminal device 14A includes a processor 191 for performing a variety of processing, a memory 192, a touch panel 193, a first communication interface 194 for communicating with the external apparatus, a second communication interface 195 for communicating with information processing device 15A, a GPS controller 196 for receiving a GPS signal or a position signal from a base station, and various sensors 197 such as an acceleration sensor and a biological sensor, as a main hardware configuration. These are connected to communicate with one another via an internal bus 199.

It should be noted that, since the hardware configuration of information processing device 15A is the same as that of information processing device 15, the detailed description thereof will not be repeated.

<Functional Configuration>

Figure 12:
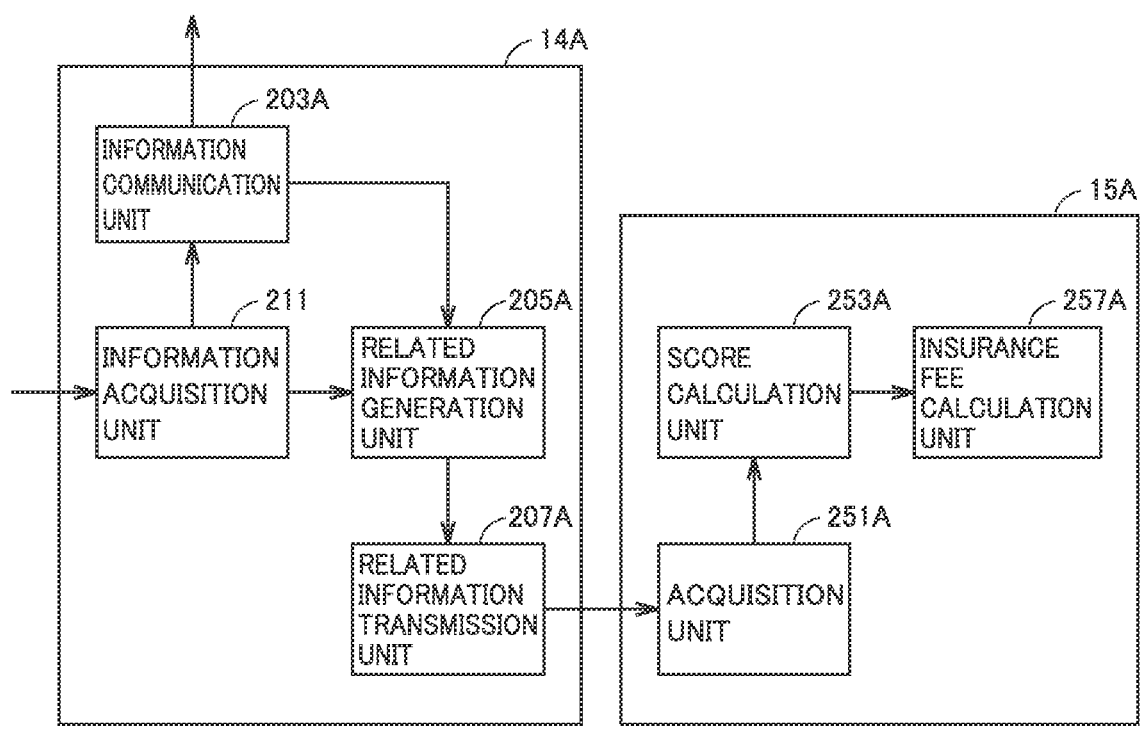
FIG. 12 is a schematic view showing a functional configuration of the terminal device and an information processing device according to the second embodiment.

FIG. 12 is a schematic view showing a functional configuration of terminal device 14A and information processing device 15A according to the second embodiment. Referring to FIG. 12, terminal device 14A includes an information acquisition unit 211, an information communication unit 203A, a related information generation unit 205A, and a related information transmission unit 207A. Typically, these functions are implemented when processor 191 executes programs stored in memory 192. It should be noted that some or all of these functions may be implemented by using dedicated circuits.

Information processing device 15A includes an acquisition unit 251A, a score calculation unit 253A, and an insurance fee calculation unit 257A.

Information acquisition unit 211 acquires the pedestrian information. Specifically, information acquisition unit 211 acquires user X's position information via GPS controller 196, acquires user X's biological information via the biological sensor, and acquires user X's destination information from the map application. Further, information acquisition unit 211 acquires user X's walking speed through computation using an output signal from the acceleration sensor.

Information communication unit 203A transmits the pedestrian information to one or more apparatuses among other vehicle 12 and roadside unit 13, via first communication interface 194. Information communication unit 203A acquires, from the one or more apparatuses, identification information of the one or more apparatuses.

Related information generation unit 205A generates related information R related to the pedestrian information transmitted from information communication unit 203A to the external apparatus within a predetermined period. Related information transmission unit 207A transmits related information R generated by related information generation unit 205A to information processing device 15A, via second communication interface 195.

Acquisition unit 251A of information processing device 15A acquires related information R transmitted from related information transmission unit 207A. Acquisition unit 251A outputs the acquired related information R to score calculation unit 253A. Score calculation unit 253A calculates a score of user X based on related information R. Insurance fee calculation unit 257A calculates a discount rate for an automobile insurance fee of vehicle 11 according to the score of user X. In the following, a more specific functional configuration of related information generation unit 205A and score calculation unit 253A will be described.

In a first example, related information generation unit 205A calculates a data amount of the pedestrian information, and generates the data amount as related information R. Specifically, score calculation unit 253A calculates a score such that the score becomes more advantageous to user X as the data amount of related information R is larger.

In a second example, related information generation unit 205A classifies the pedestrian information according to type, and generates type information acquired as a result of classification, as related information R. Specifically, related information generation unit 205A generates the type information including information indicating a type of the pedestrian information and a data amount of the pedestrian information classified into that type.

For example, the pedestrian information is classified into four types: "walking speed", "position", "biological", and "destination". A degree of importance is preset for the information indicating the type of the pedestrian information. For example, the degree of importance is set to be higher as the type information has a higher privacy, and the four types described above are listed as "biological", "destination", "position", and "walking speed" in descending order of the degree of importance.

Score calculation unit 253A calculates a score such that the score becomes more advantageous to user X as the degree of importance of the information indicating the type is higher. Specifically, score calculation unit 253A calculates a data amount Gx1 by calculating, for each type, a multiplication value obtained by multiplying the data amount by a coefficient according to the degree of importance of the type, and adding the multiplication values of the types, as expressed by the equation (1) described in the first embodiment. Score calculation unit 253A calculates a score according to data amount Gx1. Further, score calculation unit 253A may calculate the score of user X by calculating, for each type, a multiplication value obtained by multiplying a reference score by a coefficient according to the degree of importance of the type, and adding the multiplication values of the types, as expressed by the equation (2).

In a third example, related information generation unit 205A determines a transmission destination of the pedestrian information based on identification information of the external apparatus, and generates transmission destination information acquired as a result of determination, as related information R. The transmission destination information includes information indicating the transmission destination, and a data amount of the pedestrian information transmitted to that transmission destination. The transmission destination is at least one of other vehicle 12 and roadside unit 13, for example.

Score calculation unit 253A calculates a score such that the score becomes more advantageous to user X as the degree of importance of the transmission destination of the pedestrian information is higher. Specifically, score calculation unit 253A calculates a data amount Gx2 by calculating, for each transmission destination, a multiplication value obtained by multiplying the data amount by a coefficient according to the degree of importance of the transmission destination, and adding the multiplication values of the transmission destinations, as expressed by the equation (5). Score calculation unit 253A calculates a score according to data amount Gx2. Further, score calculation unit 253A may calculate the score of user X by calculating, for each transmission destination, a multiplication value obtained by multiplying a reference score by a coefficient according to the degree of importance of the transmission destination, and adding the multiplication values of the transmission destinations, as expressed by the equation (6).

<Advantages>

According to the second embodiment, it is possible to urge active information provision from terminal device 14A carried by user X who is walking to the external apparatus, which can decrease the incidence of an accident and increase the comfort of vehicle control.

Third Embodiment

A third embodiment will describe a configuration in which a score of a user of a vehicle having an automatic driving function is calculated based on a travel time or a travel distance for which the vehicle has traveled by automatic driving.

<Overall Configuration>

Figure 13:
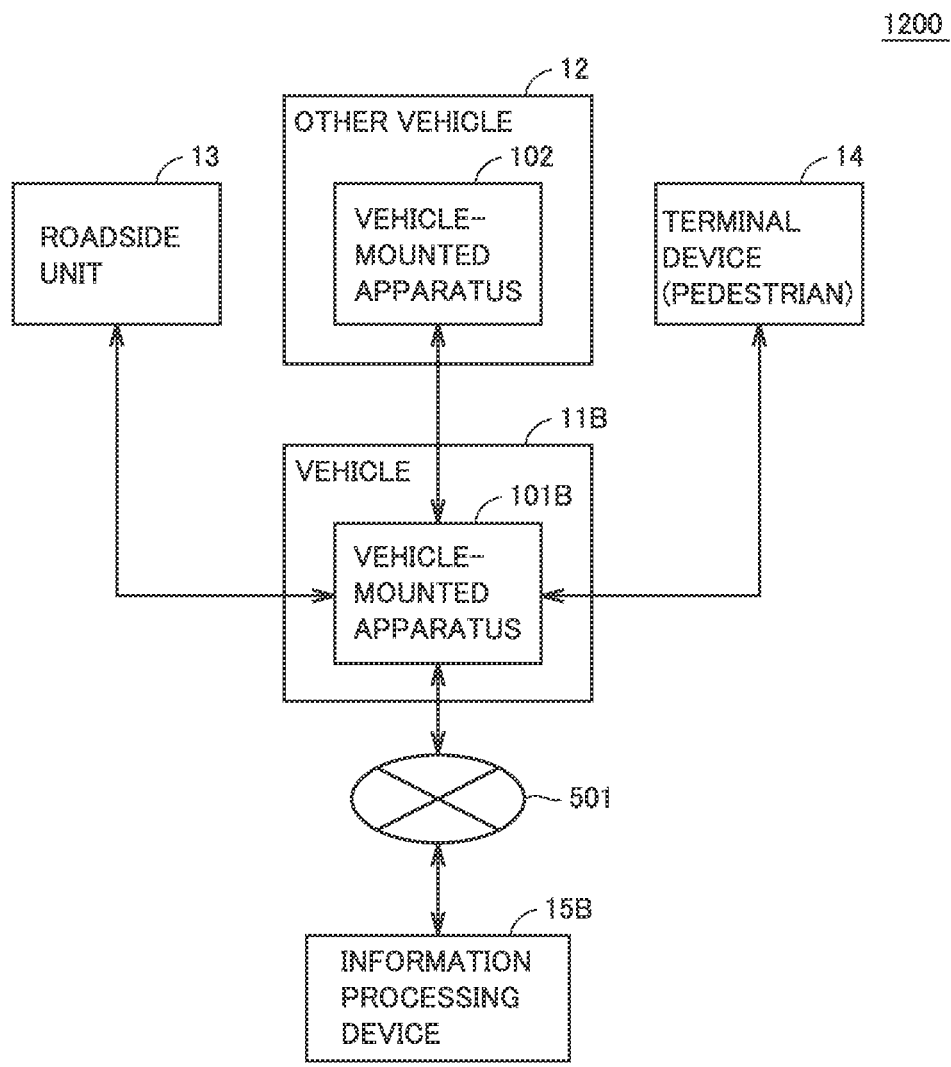
FIG. 13 is a view showing an overall configuration of an information processing system according to a third embodiment.

FIG. 13 is a view showing an overall configuration of an information processing system 1200 according to a third embodiment. Referring to FIG. 13, information processing system 1200 includes a vehicle 11B, other vehicle 12, roadside unit 13, terminal device 14, an information processing device 15B, and network 501.

Vehicle 11B is a vehicle having a known automatic driving function. While vehicle 11B is traveling by the automatic driving, vehicle 11B exchanges a large amount of information by wirelessly communicating with the other vehicle, the roadside unit, the terminal device of a pedestrian, and the like. Specifically, during the automatic driving, it is necessary to transmit a variety of information (for example, the support information described above) from vehicle 11 to the outside (for example, other vehicle 12, roadside unit 13, and terminal device 14), and it is necessary to receive a variety of information from the outside.

Further, since a variety of information is provided from vehicle 11 to other vehicle 12, roadside unit 13, and terminal device 14 of the pedestrian during the automatic driving, this can contribute to improved safety for not only vehicle 11B but also other vehicle 12 and the pedestrian, and can decrease the incidence of accidents in the entire society as a result. Therefore, the third embodiment will describe a configuration in which the score of user X of vehicle 11B is calculated by focusing on the travel time and the travel distance during the automatic driving.

The hardware configurations of vehicle-mounted apparatus 101B of vehicle 11B and of information processing device 15B are the same as the hardware configurations of vehicle-mounted apparatus 101 and of information processing device 15, respectively.

Figure 14:
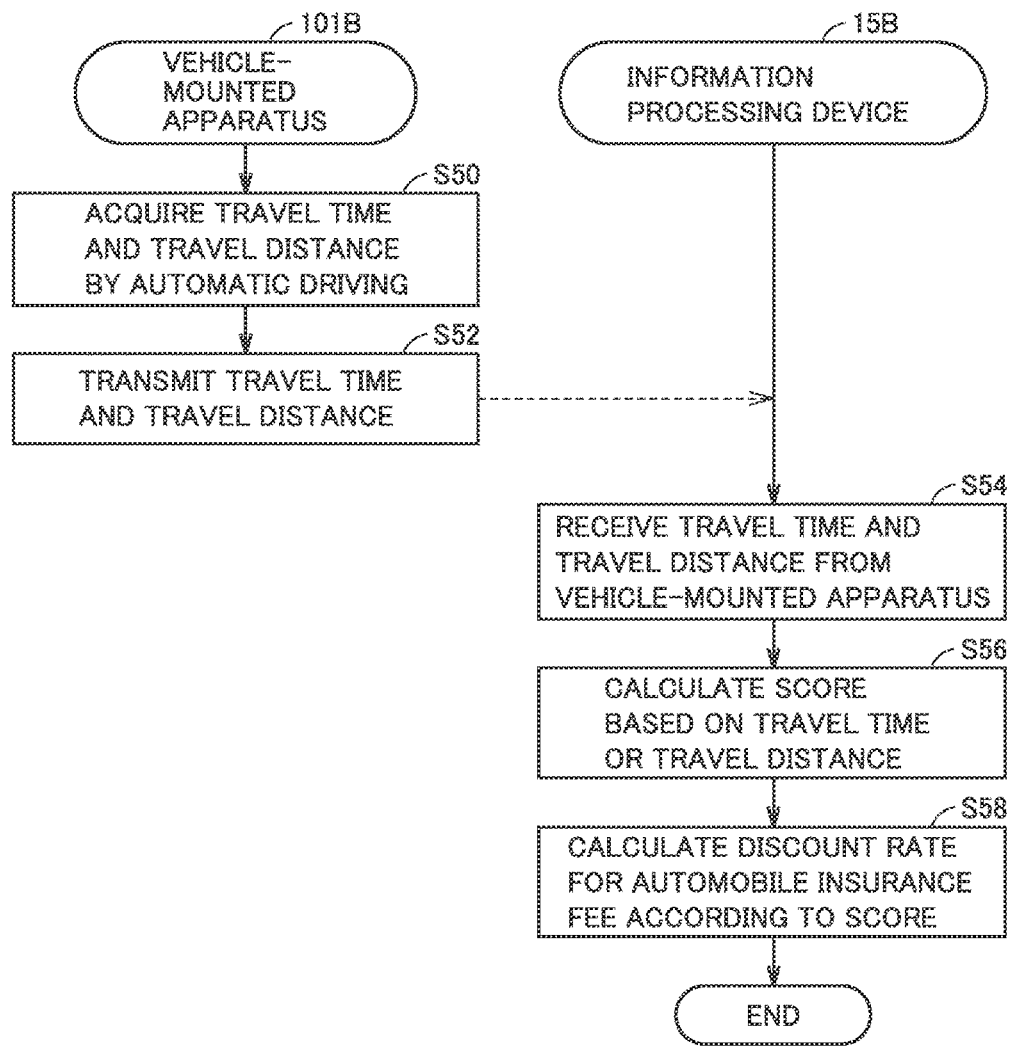
FIG. 14 is a flowchart for illustrating an example of an operation outline of the information processing system according to the third embodiment.

FIG. 14 is a flowchart for illustrating an example of an operation outline of information processing system 1200 according to the third embodiment. Typically, each step for vehicle-mounted apparatus 101B is performed by processor 151, and each step for information processing device 15B is performed by processor 171.

Referring to FIG. 14, vehicle-mounted apparatus 101B acquires at least one of a travel time Tx and a travel distance Dx for which vehicle 11B has traveled by the automatic driving within a predetermined period, from an automatic driving control device (step S50). Travel time Tx and travel distance Dx are measured by a known automatic driving control device mounted in vehicle 11B. For example, the automatic driving control device can receive input of a vehicle speed signal detected by a vehicle speed sensor, and detect a travel distance from the vehicle speed signal. The automatic driving control device measures a travel distance from a start time point to an end time point of an automatic driving mode that causes vehicle 11B to travel by the automatic driving, as travel distance Dx. Further, the automatic driving control device measures a time from the start time point to the end time point of the automatic driving mode, as travel time Tx.

Vehicle-mounted apparatus 101B transmits travel time Tx and travel distance Dx to information processing device 15B via second communication interface 155 (step S52).

Information processing device 15B receives travel time Tx and travel distance Dx transmitted from vehicle-mounted apparatus 101B, via communication interface 174 (step S54). Information processing device 15B calculates a score to be given to user X who is the owner of vehicle 11B, based on travel time Tx or travel distance Dx (step S56). Subsequently, information processing device 15B calculates a discount rate for an automobile insurance fee according to the calculated score (step S58), and terminates the processing.

<Functional Configuration>

Figure 15:
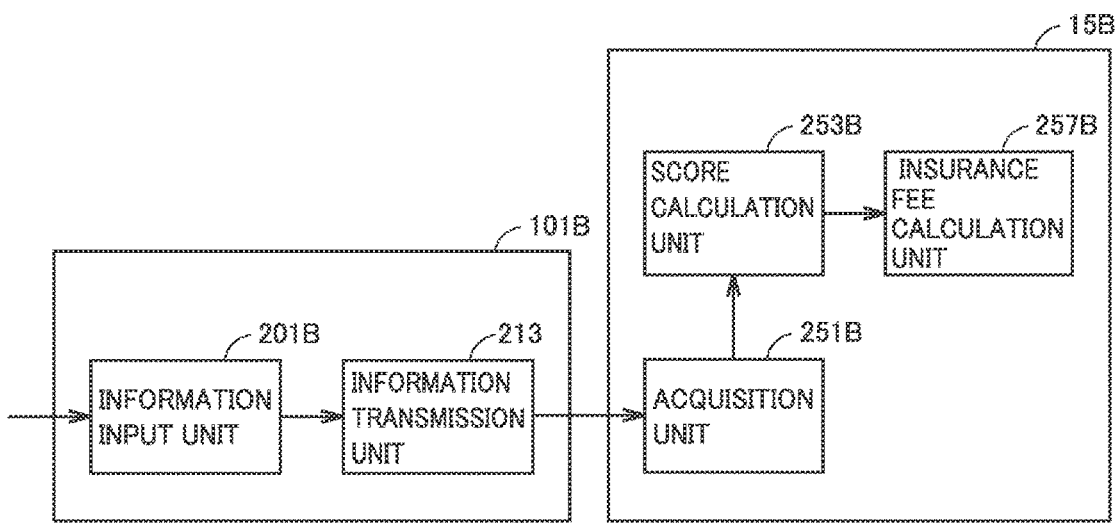
FIG. 15 is a schematic view showing a functional configuration of a vehicle-mounted apparatus and an information processing device according to the third embodiment.

FIG. 15 is a schematic view showing a functional configuration of vehicle-mounted apparatus 101B and information processing device 15B according to the third embodiment. Referring to FIG. 15, vehicle-mounted apparatus 101B includes an information input unit 201B and an information transmission unit 213. Information processing device 15B includes an acquisition unit 251B, a score calculation unit 253B, and an insurance fee calculation unit 257B.

Information input unit 201B receives input of travel time Tx for which vehicle 11B has traveled by the automatic driving within the predetermined period, via input interface 153. Further, information input unit 201B may receive input of travel distance Dx for which vehicle 11B has traveled by the automatic driving within the predetermined period, via input interface 153. Information transmission unit 213 transmits travel time Tx and travel distance Dx to information processing device 15B, via second communication interface 155.

Acquisition unit 251B acquires travel time Tx and travel distance Dx via communication interface 174. Score calculation unit 253B calculates a score of user X of vehicle 11B based on travel time Tx or travel distance Dx. Insurance fee calculation unit 257B calculates a discount rate for an automobile insurance fee of vehicle 11B according to the score of user X.

In a first example, score calculation unit 253B calculates a multiplication value obtained by multiplying travel time Tx by a reference coefficient, and calculates a score according to the multiplication value. It should be noted that the score is calculated to be higher as the multiplication value is larger. Accordingly, score calculation unit 253B calculates the score such that the score becomes more advantageous to user X as travel time Tx is longer. Alternatively, score calculation unit 253B calculates a multiplication value obtained by multiplying travel distance Dx by a reference coefficient, and calculates a score according to the multiplication value. It should be noted that the score is calculated to be higher as the multiplication value is larger. Accordingly, score calculation unit 253B calculates the score such that the score becomes more advantageous to user X as travel distance Dx is longer.

In a second example, score calculation unit 253B calculates a score of user X based on a total travel time obtained by adding, to travel time Tx, a travel time Ty by manual driving when the automatic driving control device recommends the manual driving. Score calculation unit 253B calculates a multiplication value obtained by multiplying the total travel time by a reference coefficient, and calculates a score according to the multiplication value. It should be noted that the score is calculated to be higher as the multiplication value is larger. Accordingly, score calculation unit 253B calculates the score such that the score becomes more advantageous to user X as the total travel time is longer.

Travel time Ty is a travel time from a time point when the automatic driving mode is switched to a manual driving mode in response to recommendation of the manual driving by the automatic driving control device, to a time point when the automatic driving control device cancels the recommendation of the manual driving. Travel time Ty is acquired from the automatic driving control device by information input unit 201B, and is transmitted to information processing device 15B by information transmission unit 213. Acquisition unit 251B acquires travel time Ty, and outputs travel time Ty to score calculation unit 253B.

In a third example, score calculation unit 253B calculates a score of user X of vehicle 11B based on a travel time or a travel distance for which the vehicle has traveled by the automatic driving at each automatic driving level.

Figures 16, 17:
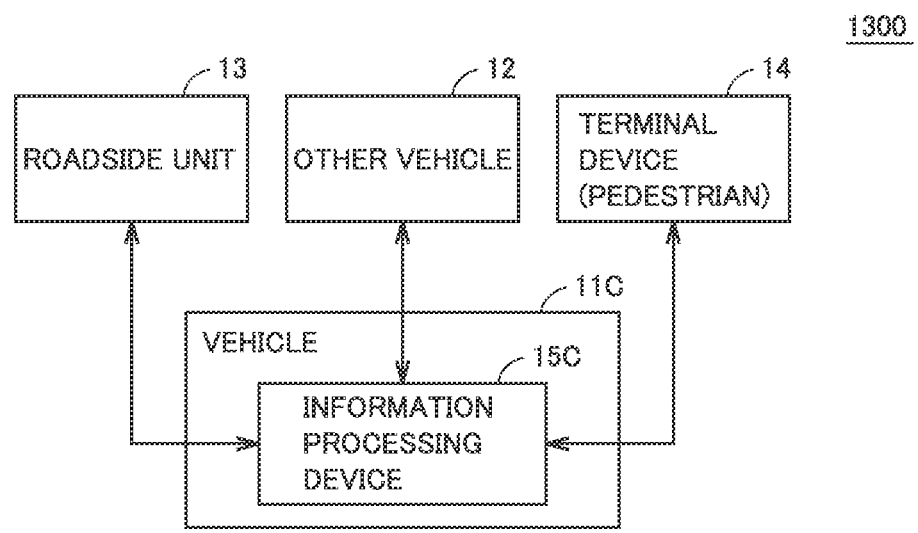
FIG. 16 is a view showing an information table of coefficients corresponding to automatic driving levels according to the third embodiment.
FIG. 17 is a view showing an overall configuration of an information processing system according to another embodiment.

FIG. 16 is a view showing an information table 311 of coefficients corresponding to automatic driving levels according to the third embodiment. Referring to FIG. 16, the coefficient is set to be higher as the automatic driving level is higher. The automatic driving level indicates a degree of dependence on an automatic driving device which controls the automatic driving of vehicle 11B. In the example of FIG. 16, the automatic driving level is classified into five stages of level 1 to level 5.

For example, automatic driving level 1 is a level which has the lowest degree of dependence on the automatic driving device, and at which any one operation among acceleration, steering, and braking is performed according to an instruction of the automatic driving control device. Automatic driving level 5 is a level which has the highest degree of dependence on the automatic driving device, and at which all operations related to driving are performed according to an instruction of the automatic driving control device. It should be noted that the automatic driving level shown in FIG. 16 is an example, and may be classified into a plurality of stages other than five stages.

In this case, information input unit 201B acquires travel time Tx and travel distance Dx at each automatic driving level, from the automatic driving control device. These pieces of information are transmitted to information processing device 15 by information transmission unit 213, and are acquired by acquisition unit 251B. Here, it is assumed that a travel time and a travel distance for which the vehicle has traveled at an automatic driving level m (where m is 1 to 5) are Txm and Dxm, respectively. In this case, score calculation unit 253B calculates a travel time TA as expressed by the following equation (7), and calculates a travel distance DA as expressed by the following equation (8).

$$TA = 0.6 \times Tx1 + 0.7 \times Tx2 + 0.8 \times Tx3 + 0.9 \times Tx4 + 1.0 \times Tx5 \quad (7)$$

$$DA = 0.6 \times Dx1 + 0.7 \times Dx2 + 0.8 \times Dx3 + 0.9 \times Dx4 + 1.0 \times Dx5 \quad (8)$$

Score calculation unit 253B calculates a score according to travel time TA. The score is calculated to be higher as the value of travel time TA is larger. Accordingly, the score becomes higher as the travel time at a higher automatic driving level is longer. This is because it is considered that, as the automatic driving level is higher, more information is exchanged between vehicle 11B and the external apparatus, and thus the degree of contribution to safety is higher. Further, score calculation unit 253B calculates a score according to travel distance DA. The score is calculated to be higher as the value of travel distance DA is larger. Accordingly, the score becomes higher as the travel distance at a higher automatic driving level is longer.

Referring to FIG. 15 again, in a fourth example, score calculation unit 253B calculates a score of user X based on a total travel time obtained by adding, to travel time Tx, a travel time Tz for which vehicle 11B has traveled on a road exclusive for the automatic driving. Alternatively, score calculation unit 253B calculates the score of user X based on a total travel distance obtained by adding, to travel distance Dx, a travel distance Dz for which vehicle 11B has traveled on the road exclusive for the automatic driving.

Travel time Tz and travel distance Dz are calculated by the automatic driving control device. Travel time Tz is, for example, a time from a time point when the automatic driving control device detects a signal of a sensor placed at the entrance of the road exclusive for the automatic driving to a time point when the automatic driving control device detects a signal of a sensor placed at the exit of the road exclusive for the automatic driving. Travel distance Dz is, for example, a distance for which vehicle 11B has traveled from the time point when the automatic driving control device detects the signal of the sensor placed at the entrance of the road exclusive for the automatic driving to the time point when the automatic driving control device detects the signal of the sensor placed at the exit of the road exclusive for the automatic driving.

Travel time Tz and travel distance Dz are acquired from the automatic driving control device by information input unit 201B, and are transmitted to information processing device 15B by information transmission unit 213. In this case, score calculation unit 253B calculates a travel time TB as expressed by the following equation (9), and calculates a travel distance DB as expressed by the following equation (10).

$$TB = s1 \times Tx + s2 \times Tz \quad (9)$$

$$DB = s1 \times Dx + s2 \times Dz \quad (10)$$

Here, s1 and s2 are positive coefficients. Score calculation unit 253B calculates a score according to travel time TB. The score is calculated to be higher as the value of travel time TB is larger. Score calculation unit 253B calculates a score according to travel distance DB. The score is calculated to be higher as the value of travel distance DB is larger.

It should be noted that, typically, s1 and s2 are set as s1<s2. Thereby, the score is calculated to be higher as travel time Tz on the road exclusive for the automatic driving is longer, and as travel distance Dz on the road exclusive for the automatic driving is longer. This is because it is considered that traveling on the road exclusive for the automatic driving has a higher degree of contribution to safety than traveling on a road other than that.

<Advantages>

According to the third embodiment, the number of accidents can be decreased by actively urging traveling of vehicle 11B by the automatic driving, and suppressing human errors.

Another Embodiment (1) Although the first embodiment described above describes the configuration in which information processing device 15 is provided outside vehicle 11, the present disclosure is not limited to that configuration, and information processing device 15 may be provided inside vehicle 11, as shown in FIG. 17.

FIG. 17 is a view showing an overall configuration of an information processing system 1300 according to another embodiment. Referring to FIG. 17, information processing system 1300 includes a vehicle 11C, other vehicle 12, roadside unit 13, and terminal device 14.

Vehicle 11C is provided with an information processing device 15C. In this case, information processing device 15C has each function of vehicle-mounted apparatus 101 and each function of information processing device 15 described above. The hardware configuration of information processing device 15C is the same as the hardware configuration of vehicle-mounted apparatus 101, for example. It should be noted that vehicle-mounted apparatus 101 and information processing device 15 may be individually mounted inside vehicle 11C.

(2) The value of each coefficient described in the embodiments described above may be reviewed as appropriate.

(3) Although the embodiments described above describe the configuration in which the score of the user is used for the discount rate of the automobile insurance fee, the present disclosure is not limited to that configuration. For example, the score of the user may be used for a discount rate for a utilization fee of a facility which is utilized by the vehicle of the user (for example, a charged highway road or the like). In this case, information processing device 15 is provided with a facility utilization fee calculation unit, instead of the insurance fee calculation unit. The facility utilization fee calculation unit calculates a discount rate for a facility utilization fee of vehicle 11 according to the score of user X. Typically, the discount rate becomes higher as the score of user X is higher. Accordingly, the user can obtain a monetary merit that the facility utilization fee becomes less expensive as the score is higher.

Further, the score of user X may be applied to a certain indicator (for example, the degree of contribution to an automatic driving society) to allow user X to perceive a social merit in providing information to the outside (for example, utility value of data in automatic driving, contribution to environmental problems by energy saving). Typically, information processing device 15 calculates the degree of contribution to be higher as the score is higher, and provides the degree of contribution to user X. Thereby, user X can perceive the merit in providing information to the outside by confirming the degree of contribution, and thus it is considered that user X will actively provide information to the outside.

(4) Each of the configurations illustrated as the embodiments described above is an example of the configuration of the present disclosure, and it can be combined with another known technique, or can be modified, for example partially omitted, within the scope not departing from the gist of the present disclosure. Further, in each embodiment described above, the processing or the configuration described in another embodiment may be employed and implemented as appropriate.

It should be understood that the embodiments disclosed herein are illustrative and non-restrictive in every respect. The scope of the present disclosure is defined by the scope of the claims, rather than the description above, and is intended to include any modifications within the scope and meaning equivalent to the scope of the claims.

REFERENCE SIGNS LIST 11, 11B, 11C: vehicle; 12: other vehicle; 13: roadside unit; 14, 14A: terminal device; 15, 15A to 15C: information processing device; 101, 101B, 102: vehicle-mounted apparatus; 151, 171, 191: processor; 152, 172, 192: memory; 153: input interface; 154, 194: first communication interface; 155, 195: second communication interface; 159, 179, 199: internal bus; 173: input device; 174: communication interface; 175: display; 193: touch panel; 196: controller; 197: various sensors; 201, 201B: information input unit; 203, 203A: information communication unit; 205, 205A: related information generation unit; 207, 207A: related information transmission unit; 211: information acquisition unit; 213: information transmission unit; 251, 251A, 251B:

acquisition unit; 253, 253A, 253B: score calculation unit; 255: information storage unit; 257, 257A, 257B: insurance fee calculation unit; 300, 301, 303, 305, 307, 311: information table; 501: network; 1000, 1100, 1200, 1300: information processing system.

The invention claimed is:

1. An information processing device comprising:
    a communication interface connected to receive data transmitted from plural vehicle-mounted apparatuses and one or more second apparatuses over a network, the vehicle-mounted apparatus including sensors configured to collect data for monitoring a moving vehicle and a driver of the moving vehicle; and
    a processor configured to include:
        an acquisition unit connected to acquire the data from the communication interface, the data including related information related to support information for supporting safe driving of a vehicle associated with the vehicle-mounted apparatus, and a travel distance of the vehicle measured by one or more sensors of the vehicle associated with the vehicle-mounted apparatus, the support information including sensor data collected by the vehicle-mounted apparatus, the related information identifying at least a data amount of the support information;
        a control unit to generate a signal for controlling an operation of the vehicle based on the data received from the one or more second apparatuses; and
        a score calculation unit to calculate a score that measures a contribution an owner of the vehicle makes toward road safety based on at least one of the data amount of the support information included in the related information and the travel distance of the vehicle; and
    the communication interface, based on the score, transmitting the support information to the one or more second apparatuses among a roadside unit, another vehicle, and a mobile terminal device for increasing vehicle control and the amount of related information.

2. The information processing device according to claim 1, wherein the score calculation unit calculates the score such that the score becomes more advantageous to the owner as a data amount obtained by normalizing the data amount of the support information by the travel distance of the vehicle is larger.

3. The information processing device according to claim 1, wherein the score calculation unit calculates the score such that the score becomes more advantageous to the owner as the data amount of the support information is larger, and as the travel distance of the vehicle is shorter.

4. The information processing device according to claim 1, wherein the score calculated by the score calculation unit is used for a discount rate for an automobile insurance fee of the vehicle, or a discount rate for a utilization fee of a facility which is utilized by the vehicle.

5. An information processing device comprising:
    a communication interface connected to receive data from plural vehicle-mounted apparatuses and one or more second apparatuses over a network, the vehicle-mounted apparatuses including sensors configured to collect data for monitoring at least a moving vehicle;
    a processor configured to include:
        an acquisition unit to acquire the data from the communication interface, the data including related information related to support information for supporting safe driving of a vehicle, the support information including sensor data collected by the vehicle-mounted apparatus for monitoring the moving vehicle during driving;
        a control unit to generate a signal for controlling an operation of the vehicle based on the data received from the one or more second apparatuses; and
        a score calculation unit to calculate a score that measures a contribution an owner of the vehicle makes toward road safety from a data amount of the support information included in the related information,
        the related information including at least one of information indicating a type of the support information, a price range of a device that has generated the support information, and a transmission destination of the support information transmitted from the vehicle,
        the processing device configured to generate a coefficient based on the related information, and the coefficient being by the score calculation unit to calculate the score, and
    the communication interface transmitting the support information to the one or more second apparatuses among a roadside unit, another vehicle, and a mobile terminal device for increasing vehicle control and the amount of related information.

6. The information processing device according to claim 5, wherein
    the acquisition unit acquires a travel distance of the vehicle, the score calculation unit inputs at least one piece of information among the related information and the travel distance of the vehicle to a learned estimation model, and calculates the score to be given to the owner, and
    the estimation model is subjected to learning processing using a data set for learning, such that, upon receiving the at least one piece of information, the estimation model outputs the score to be given to the owner as an estimation result.

7. An information processing device comprising:
    a communication interface connected to receive data from a mobile terminal device of an owner of a vehicle and one or more second apparatuses over a network;
    a processor configured to include:
        an acquisition unit to acquire the data from the communication interface, the data including related information related to support information of an owner of a vehicle, the support information including sensor data collected by the mobile terminal device of the owner,
        a control unit to generate a signal for controlling an operation of another vehicle based on the data received from the mobile terminal device and the one or more second apparatuses; and
        a score calculation unit to calculate a score that measures a contribution the owner of the vehicle makes toward road safety, the score to be given to the owner based on the related information,
        the information of the owner being information about the owner who is walking which is utilized to support safe driving of the other vehicle,
        the score calculated by the score calculation unit being used for a discount rate for an automobile insurance fee of the vehicle, or a discount rate for a utilization fee of a facility which is utilized by the vehicle, and
    the communication interface, based on the score, transmitting the support information to the one or more apparatuses among a roadside unit, another vehicle, and the mobile terminal device for increasing vehicle control and the amount of related information.

8. An information processing device comprising:
a communication interface connected to receive data transmitted from plural vehicle-mounted apparatuses and one or more second apparatuses, the vehicle-mounted apparatus including sensors configured to collect data for monitoring a moving vehicle and an owner of the moving vehicle;
a processor configured to include:
  an acquisition unit to acquire the data from plural vehicle mounted apparatuses, the data including a travel time or a travel distance for which the vehicle has traveled by automatic driving within a predetermined period;
  a control unit to generate a signal for controlling an operation of the vehicle during automatic driving based on the data received from the one or more second apparatuses; and
  a score calculation unit to calculate a score that measures a contribution an owner of the vehicle makes toward road safety, the score to be given to an owner of the vehicle based on the travel time or the travel distance acquired by the acquisition unit,
  the score calculation unit calculating the score to be given to the owner of the vehicle based on a total travel time obtained by adding to the travel time for which the vehicle has traveled by the automatic driving, a travel time by manual driving when a control device for the automatic driving mounted in the vehicle recommends the manual driving, and
  the communication interface, based on the score, transmitting the support information to the one or more apparatuses among a roadside unit, another vehicle, and a mobile terminal device for increasing vehicle control and the amount of related information.

9. The information processing device according to claim 8, wherein
the automatic driving is classified into a plurality of automatic driving levels,
for each of the plurality of automatic driving levels, the acquisition unit acquires a travel time or a travel distance for which the vehicle has traveled by the automatic driving at the automatic driving level, and
the score calculation unit calculates the score to be given to the owner of the vehicle based on the travel time or the travel distance for which the vehicle has traveled by the automatic driving at the automatic driving level.

* * * * *